United States Patent
Calomeris

(10) Patent No.: US 11,310,900 B2
(45) Date of Patent: Apr. 19, 2022

(54) PULSE LASER-DRIVEN PLASMA CAPACITOR

(71) Applicant: Anthony Calomeris, Silver Spring, MD (US)

(72) Inventor: Anthony Calomeris, Silver Spring, MD (US)

(*) Notice: Subject to any disclaimer, the term of this patent is extended or adjusted under 35 U.S.C. 154(b) by 888 days.

(21) Appl. No.: 16/132,084

(22) Filed: Sep. 14, 2018

(65) Prior Publication Data

US 2019/0120219 A1    Apr. 25, 2019
US 2020/0217310 A9    Jul. 9, 2020

Related U.S. Application Data

(63) Continuation-in-part of application No. 15/499,837, filed on Apr. 27, 2017, now Pat. No. 10,704,540.

(60) Provisional application No. 62/657,251, filed on Apr. 13, 2018, provisional application No. 62/657,217, filed on Apr. 13, 2018, provisional application No. 62/558,516, filed on Sep. 14, 2017, provisional application No. 62/491,104, filed on Apr. 27, 2017,
(Continued)

(51) Int. Cl.
| | |
|---|---|
| H05H 1/24 | (2006.01) |
| H01G 4/018 | (2006.01) |
| H01B 3/00 | (2006.01) |
| H02J 7/34 | (2006.01) |

(52) U.S. Cl.
CPC ............ *H05H 1/2406* (2013.01); *H01B 3/00* (2013.01); *H01G 4/018* (2013.01); *H02J 7/345* (2013.01); *H02J 2207/40* (2020.01); *H02J 2207/50* (2020.01)

(58) Field of Classification Search
CPC ........ H05H 1/2406; H01B 3/00; H01G 4/018; H02J 7/345; H02J 2207/40; H02J 2207/50; F04B 19/24; F04B 53/10; F04F 7/00
USPC ....................................................... 320/166
See application file for complete search history.

(56) References Cited

U.S. PATENT DOCUMENTS

| | | | | |
|---|---|---|---|---|
| 6,586,757 | B2 * | 7/2003 | Melnychuk | B82Y 10/00 |
| | | | | 250/493.1 |
| 10,279,531 | B2 * | 5/2019 | Pagliarini | B29C 49/46 |
| 10,704,540 | B2 * | 7/2020 | Calomeris | F04B 53/10 |

OTHER PUBLICATIONS

Hidenori et al., Industrial Applications of Pulsed Power Technology, Jul. 19, 2007, IEEE Transactions on Dielectrics and Electrical Insulation vol. 14, No. 5; Oct. 2007, pp. 1051-1061 (Year: 2007).*
(Continued)

*Primary Examiner* — M Baye Diao
(74) *Attorney, Agent, or Firm* — Duane Morris LLP; Patrick Craig Muldoon

(57) ABSTRACT

Systems and method of electrical power generation. The system and method controls the timescale of electron dynamics and makes use of avalanche ionization, electro-dynamic flows, magnetic fields, polarization, radiation emissions, shock wave front, impulse pressure, and heat transfer, created by plasma generated by exposing a fluid to an ultrashort wavelength laser pulse from a femtosecond laser, a nanosecond laser combined with a femtosecond laser, or a typical laser enhanced by a discharge barrier, and the fluid guided by a shock reflecting tube, electro-laser wave guide, plasma discharge gap or check valves that create vortexes to resist backflow, through a capacitor. The fluid and plasma being accumulated and recombined in a storage chamber in a compressed state, or recycled for cyclical power generation.

23 Claims, 20 Drawing Sheets

Related U.S. Application Data provisional application No. 62/328,135, filed on Apr. 27, 2016, provisional application No. 62/328,147, filed on Apr. 27, 2016, provisional application No. 62/328,141, filed on Apr. 27, 2016, provisional application No. 62/328,137, filed on Apr. 27, 2016, provisional application No. 62/328,151, filed on Apr. 27, 2016.

(56) References Cited

OTHER PUBLICATIONS

V.V. Semak et al., "Effect of Power Losses on Self-Focusing of High-Intensity Laser Beam in Gases," Journal of Physics D: Applied Physics, vol. 46, No. 18, 2013, 2pgs. http://iopscience.iop/article/ Abstract.
W. Lotshaw, "Ultrashort-Pulse Lasers for Space Applications," The Aerospace Corporation, Crosslink Magazine, 2011, 9pgs. http://www.aerospace.org/crosslinkmag/spring-2011/ultrashort-pulse-lasers-for-space.
S. Ghosh, "Direct Numerical Simulation of the Interaction of a Laser-Induced Plasma with Isotropic Turbulence," University of Minnesota, ProQuest Publishing, 2008, 24pgs.
C.G. Parigger et al., "Measurement and Analysis of OH Emission Spectra Following Laser-Induced Optical Breakdown in Air," PubMed, Applied Optics, 42(30), 2003, 1pg. http://www.ncbi.nlm.nih.gov/pubmed/14594055 Abstract.
C.G. Parigger et al., "Spatially and Temporally Resolved Electron Number Density Measurements in Decaying Laser-Induced Plasma using Hydrogenalpha Line Profiles," PubMed, Applied Optics, 34(18), 1995, 1 pg. http://www.ncbi.nlm.nih.gov/pubmed/21052139 Abstract.
C.G. Parigger et al., "Electron Number Density and Temperature Measurement in a Laser-Induced Hydrogen Plasma," Journal of Quantitative Spectroscopy and Radiative Transfer, Elsevier B.V., vol. 53, Issue 3, 1995, 2pgs. http://www.sciencedirect.com/science/artice/pii/002240739500578 Abstract.
K. Rohlena et al., "Influence of the Laser Spark Generation Mechanism on Electric and Magnetic Fields in its Vicinity," Institute of Physics, A.S.C.R., 40th EPS Conference on Plasma Physics, 4pgs.
N.W. Jalufka, "Laser-Powered MHD Generators for Space Application," National Aeronautics and Space Administration, NASA Technical Paper 2621, 1986, 14pgs.
D.C. Smith et al., "Ignition and Maintenance of a CW Plasma in Atmospheric-Pressure Air with CO2 Laser Radiation," Applied Physics Letter, vol. 22, No. 10, May 15, 1973, 2pgs. http://aip.scitation.org/doi/abs/ Abstract.
T.W. Johnston et al., "Correct Values for High-Frequency Power Absorption by inverse Bremsstrahlung in Plasmas," Physics of Fluids, vol. 16, Issue 5, 1973, 3pgs. http://aip.scitation.org/doi/abs Abstract.
M.H. Key, "High Temperature Plasma Physics and It's Applications—Interactions of Intense Laser Radiation With Plasma," Philosophical Transactions of the Royal Society, a Mathematical, Physical and Engineering Sciences, vol. 300, Issue 1456, Apr. 23, 1981, 2pgs. http://rsta.royalsocietypublishing.org Abstract.
R. Decoste et al., "Transverse Heating of a Cold Dense Helium Plasma by a Pulsed CO2 Laser Beam," Journal of Applied Physics, vol. 45, No. 3, 1974, 3pgs. http://aip.scitation.org/doi/abs Abstract.
A. Caldwell et al., "Path to AWAKE: Evolution of the Concept," Nuclear Instruments and Methods in Physics Research Section A.: Accelerators, Spectrometers, Detectors and Associated Equipment, vol. 829, 2016, 2pgs. http://www.sciencedirect.com/science/article/pii Abstract.
D.F. Gordon et al., "Electro-Optic Shocks from Ultra Intense Laser-Plasma interactions," Physical Review Letters vol. 101, Issue 4, 2008, 2pgs. https://journals.aps.org/prl/abstract/10. Abstract.
A. Lazarian,"Turbulence in Atomic Hydrogen," Princeton University Observatory, Princeton, N.J. 08544, 1998, pp. 119-129.
F.H. Shu, "The Physics of Astrophysics, vol. I, Radiation," University Science Books, First Edition, 1991, 2pgs. http://adsabs.harvard.edu/abs/1991 pav Abstract.
F.H. Shu, "The Physics of Astrophysics, vol. II, Gas Dynamics," University Science Books, First Edition, 2009, 2pgs. http://adsabs.harvard.edu/abs/1992phas.book Abstract.
C. Clarke et al., "Principles of Astrophysical Fluid Dynamics," University of Cambridge, Cambridge University Press, 1pg. http://adsabs.harvard.edu/abs/2003pafd.book Abstract.
B. Ryden et al., "Foundations of Astrophysics," Instructor Solutions Manual, Addison-Wesley, 1st edition, 2010, 16pgs.
C. Bree, "Self-Compression of Intense Optical Pulses and the Filamentary Regime of Nonlinear Optics," PhD diss., Humboldt-Universitat zu Berlin, MathematischNaturwissenschaftliche Fakultat I, 2011.
S. Skupin et al., "Self-Compression by Femtosecond Pulse Filamentation: Experiments Versus Numerical Simulations," Physical Review E 74, 2006, 9pgs.
A. Chiron et al., "Numerical Simulations of the Nonlinear Propagation of Femtosecond Optical Pulses in Gases," The European Physical Journal D-Atomic, Molecular, Optical and Plasma Physics vol. 6, Issue 3, 1999, 1 pg. https://link.springer.com/article/10 Abstract.
C. Kohler et al., "Saturation of the Nonlinear Refractive Index in Atomic Gases," Physical Review A 87 (4), 2013, 9pgs.
S. Ghosh et al., "DNS of the Thermal Effects of Plasma/Turbulence Interaction," American Physical Society, 59th Annual Meeting of the APS Division of Fluid Dynamics, Nov. 19-21, 2006, #EM.003, 3pgs. http://adsabs.harvard.edu/abs/2006APS Abstract.
A. Ekchian et al., "Flow Visualization Study of the Intake Process of an Internal Combustion Engine," Department of Mechanical Engineering, Massachusetts Institute of Technology, 1979, 1 pg. http://papers.sae.org/790095 Abstract.
J. Ju et al. "Femtosecond Laser Filament Induced Condensation and Precipitation in a Cloud Chamber," Scientific Reports 6, Article No. 25417, 2016, 23pgs. https://www.nature.com/articles/srep.
G.K. Batchelor, "An Introduction to Fluid Dynamics", Department of Applied Mathematics and Theoretical Physics, Cambridge England, University of Cambridge, 1967, 1 pg.
N.A. Bobrova et al., "MHD Simulations of Plasma Dynamics in Pinch Discharges in Capillary Plasmas," Laser and Particle Beams 18, 2000, pp. 623-638.
C.R. Phipps Jr. et al., "Impulse Coupling to Targets in Vacuum by KrF, HF and CO2 Lasers," Journal Applied Physics, vol. 64, 1083, 1988, 44pgs.
R.O. Cleveland et al., "The Physics of Shock-Wave Lithotripsy," vol. 11, 3rd Edition, Smith's Textbook of Endourology, Chapter 38, 16pgs.
C. Courtois et al., "Creation of a Uniform High Magnetic-Field Strength Environment for Laser-Driven Experiments," Journal of Applied Physics vol. 98, Issue 5, 054913, 2005, 2pgs. http://aip.scitation.org/doi/abs Abstract.
H. Daido et al., "Generation of a Strong Magnetic Field by an Intense CO2 Laser Pulse," Physical Review Letters vol. 56, Issue 8,1986, 2pgs. https://journals.aps.org/prl/abstract Abstract.
E.I. Bichenkov et al., "On the Refinement of the Theoretical Model for a High-Voltage Spiral Generator," Technical Physics, vol. 52, Issue 12, 2007, 1 pg. https:link.springer.com/article/10.1134 Abstract.
R. Fabbro et al., "Physical Study of Laser-Produced Plasma in Confined Geometry", Journal of Applied Physics, vol. 68 (2), Jul. 15, 1990, pp. 775-784.
D.W. Forslund et al., "Theory of Hot-Electron Spectra at High Laser Intesity," Physical Review Letters vol. 39, Issue 5, 284, 1977, 2pgs. https://journals.aps.org/prl/abstract Abstract.
S. Fujioka et al., "Kilotesla Magnetic Field Due to a Capacitor-Coil Target Driven by High Power Laser," Applied Physics, Scientific Reports 3, Article No. 1170, 2013, 18pgs. https://www.nature.com/articles.srep01170.
P. Gregorcic et al., "High-Speed Two-Frame Shadowgraphy for Velocity Measurements of Laser-Induced Plasma and Shock-Wave

(56) References Cited

OTHER PUBLICATIONS

Evolution," Optics Letters, vol. 36, Issue 15, 2011, 2pgs. https://www.osapublishing.org/ol/abstract.cfm?uri Abstract.

P. Gregorcic et al., "Two-Dimensional Measurements of Laser-Induced Breakdown in Air by High-Speed Two-Frame Shadowgraphy," Applied Physics A, Materials Science & Processing, Springer, 2012, 7pgs.

B.M. Heineike, "Modeling Morphogenesis with Reaction-Diffusion Equations using Galerkin Spectral Methods," Trident Scholar Project Report No. 296, Naval Academy, Annapolis, MD, 2002, 92pgs.

L.F. Henderson, "On Shock Impedance," Journal of Fluid Mechanics, vol. 40, Issue 4, 1970, 1 pg. https://www.cambridge.org/core/journals/ Abstract.

L.F. Henderson, "General Laws for Propagation of Shock Waves through Matter," Handbook of Shock Waves, Department of Mechanical Engineering, University of Sidney, vol. 1, 2001, Chapter 2, 38pgs.

A.L. Hobbs, "Construction and Quantification of a Toroidal Bubble Apparatus", 2000, Master of Science in Engineering Acoustics, Naval Postgraduate School, Monterey,C A, p. 103.

K. Holtappels, et al., "Hydrogen Storage in Glass Capillary Arrays for Portable and Mobile Systems," Fuel Cell & Hydrogen Energy, 2009, 8pgs.

T. Hosokai et al., "Application of Fast Imploding Capillary Discharge for Laser Wakefield Acceleration," Proceedings of the 1999 Particle Accelerator Conference, New York, IEEE 1999, 3pgs.

J. E. Cates et al., "Shock Wave Focusing Using Geometrical Shock Dynamics," American Institute of Physics, Physics of Fluids vol. 9, No. 10, 1997, 11 pgs.

M. Jain et al., "Magnetic Field Enhancement of Self-Focusing of Laser Beams in Semiconductors," Physical Review B 8, 1973, 1 pg. https://journals.aps.org/prb/abstract/10.0003 Abstract.

O.J. Shariatzadeh et al.,"Computational Modeling of a Typical Supersonic Converging-Diverging Nozzle and Validation by Real Measured Data," Department of Mechanical Engineering, Cutin University, 2014,, 6pgs.

D.L. Jones, "Intermediate Strength Blast Wave," Physics of Fluids vol. 11, No. 8, 1968, 2pgs. http://aip.scitation.org/doi/abs/10.1063/1 Abstract.

K.L. Lim et al., "Solid-State Materials and Methods for Hydrogen Storage: A Critical Review," Chemical Engineering Technology, vol. 33, Issue 2, 2010, 2pgs. http://onlinelibrary.wiley.com/doi/10.1002/ceat Abstract.

M. Litos et al., "High-Efficiency Acceleration of an Electron Beam in a Plasma Wakefield Accelerator," Nature, vol. 515, Macmillan Publishers Limited, 2014, 10pgs.

\* cited by examiner

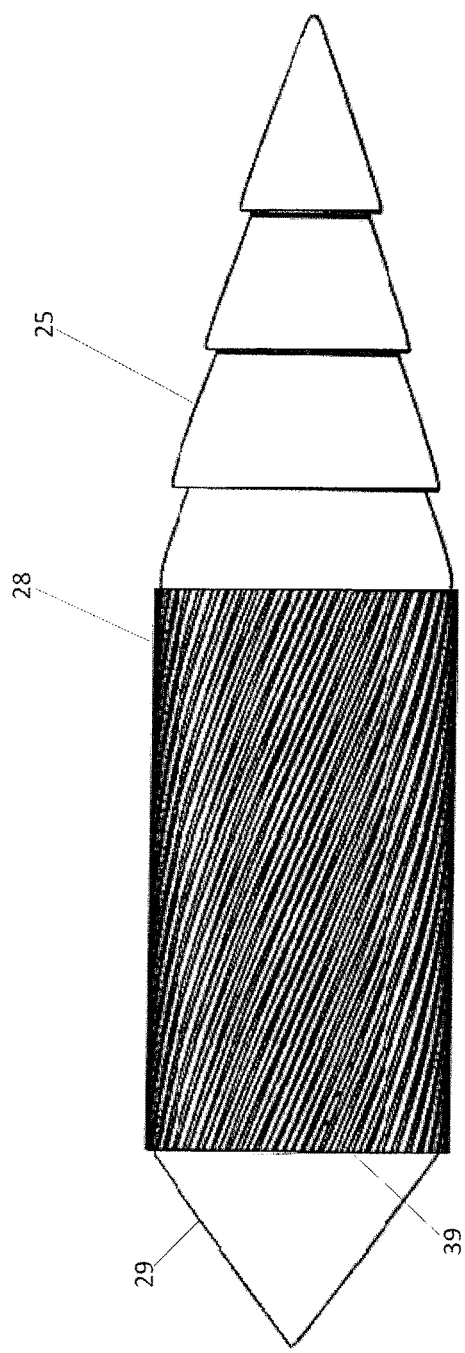
FIG. 4A
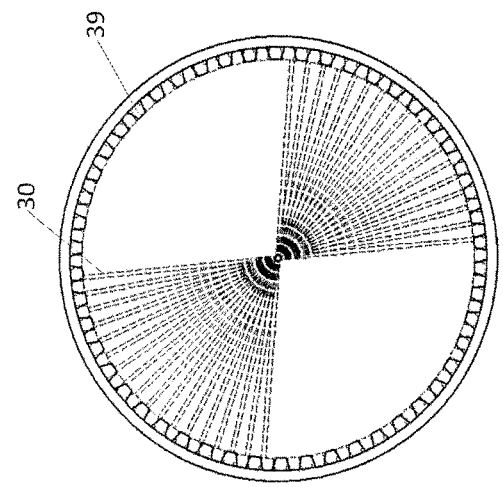
FIG. 4C
FIG. 4B

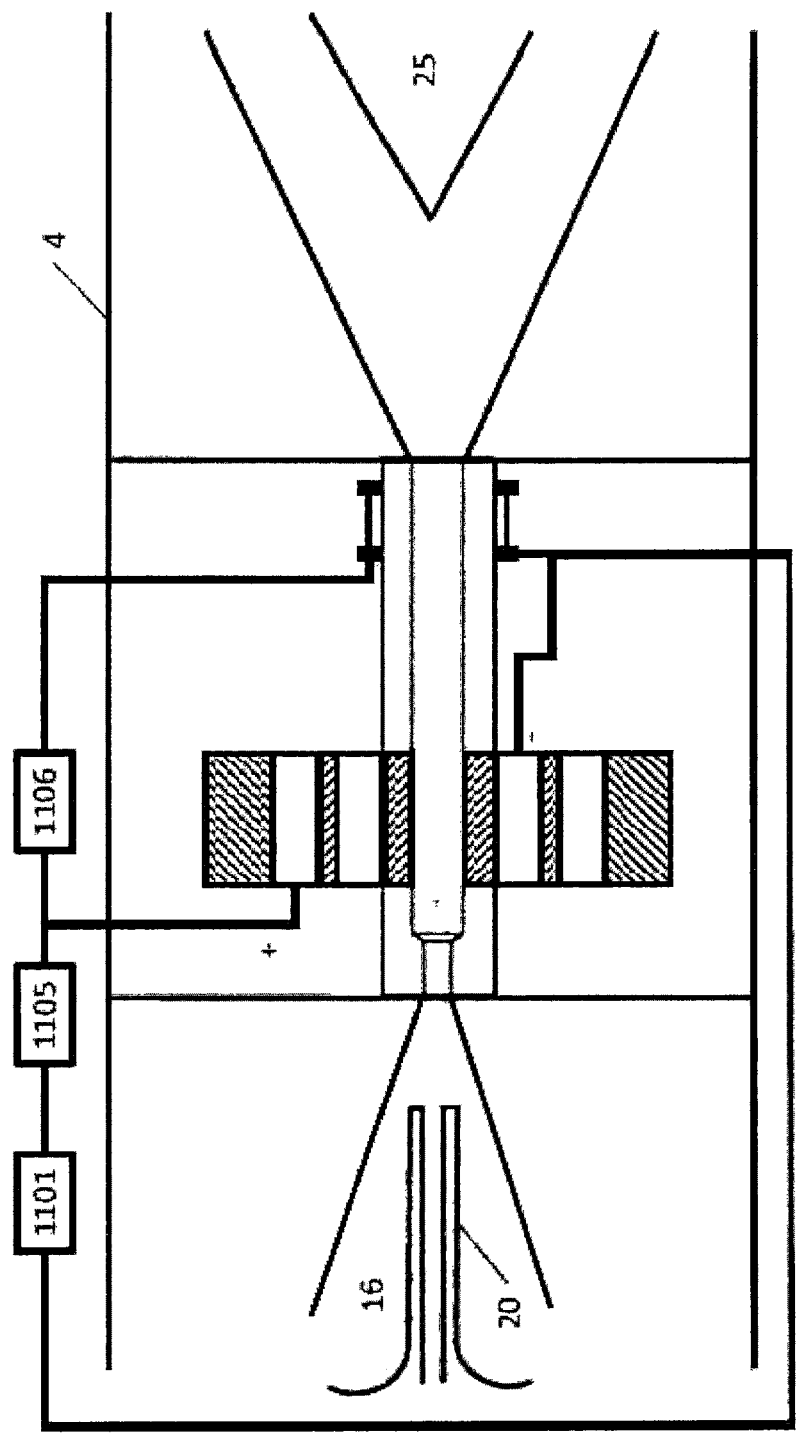

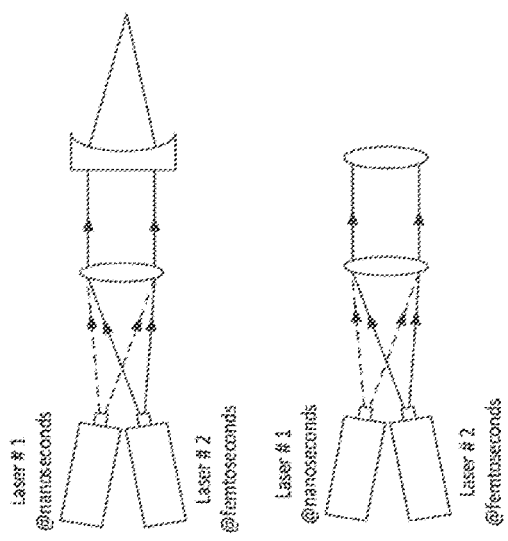
Fig. 15A
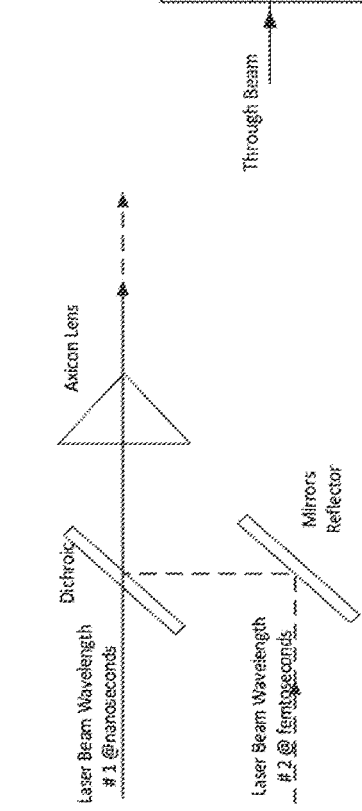
Fig. 15B
Fig 15C
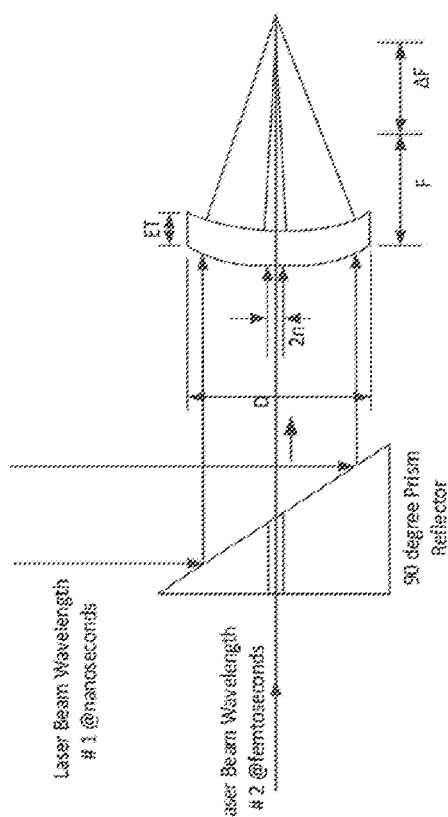
Fig 15D
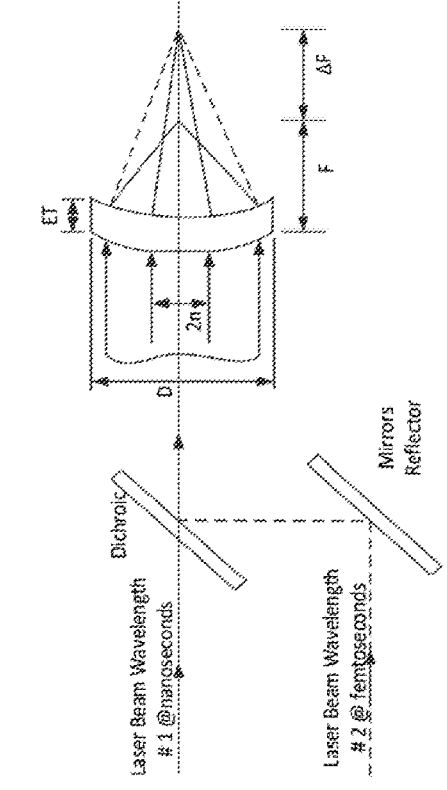
Fig 15E

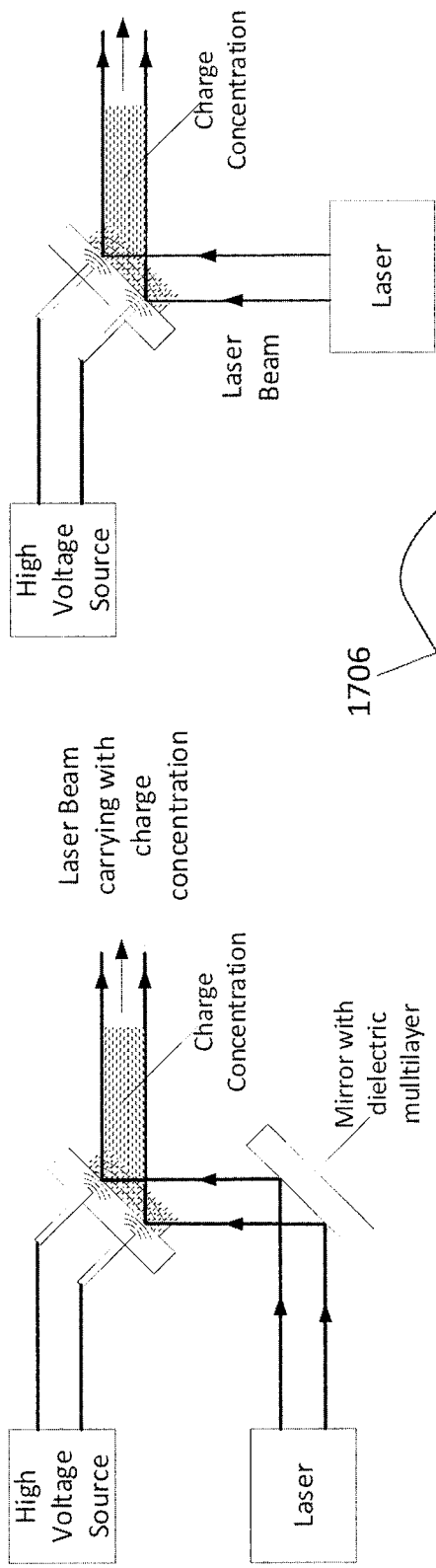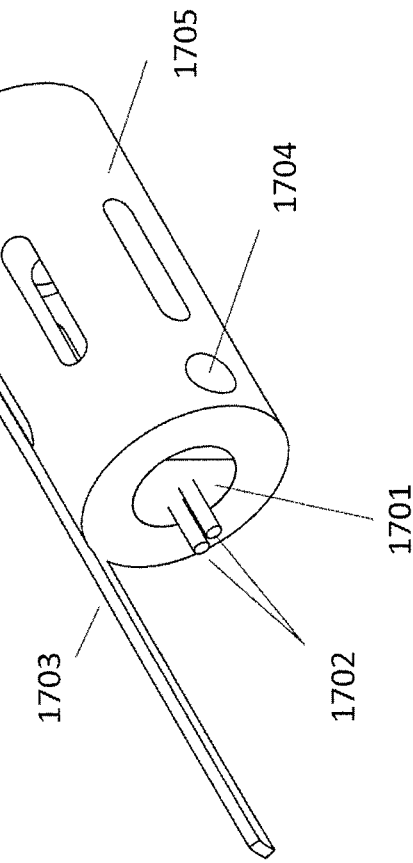
Fig. 17A
Fig. 17B
Fig. 17C

PULSE LASER-DRIVEN PLASMA CAPACITOR

RELATED APPLICATIONS

The present application is a Continuation In Part of application Ser. No. 15/499,837 filed on 27 Apr. 2017 entitled "Ultrashort Pulse Laser-Driven Shock Wave Gas Compressor". Which is a utility of and claims priority benefit of provisional application No. 62/328,135 filed on 27 Apr. 2016 entitled "Ultrashort Laser Driven Shock Wave Compressor Using Laser Driven Mechanism"; 62/328,137 filed on 27 Apr. 2016 entitled "Ultrashort Laser Driven Shock Wave Compressor Using Laser Driven Mechanism"; 62/328,141 filed on 27 Apr. 2016 entitled "Ultrashort Laser Driven Shock Wave Compressor Using Laser Driven Mechanism"; 62/328,147 filed on 27 Apr. 2016 entitled "Ultrashort Laser Driven Shock Wave Compressor Using Laser Driven Mechanism" and 62/328,151 filed 27 Apr. 2016 entitled "Ultrashort Laser Driven Shock Wave Compressor Using Laser Driven Mechanism". The present application also claims priority benefit of U.S. Provisional Application No. 62/491,104, filed 27 Apr. 2017 and entitled "Laser Beam Arrays for Compressor/Gas Generator/Plasma Generator". The present application also claims priority benefit of provisional application No. 62/558,516 filed 14 Sep. 2017 entitled "Plasma Capacitor", 62/657,217 filed on 13 Apr. 2018 entitled "Plasma Capacitor", and 62/657,251 filed on 13 Apr. 2018 entitled "Tazer Beam and Plasma Capacitor". The entirety of each of the above-listed applications are hereby incorporated herein by reference.

FIELD OF THE DISCLOSURE

The present disclosure relates generally to fluid compression, and more specifically to systems and methods of compressing hydrogen via plasma generation, precluding the need for rotating machinery or hydrated electrochemicals.

BACKGROUND

Production and storage of compressed hydrogen in any form such as conventional compressed gas, liquid, hydrides, nanotubes, capillary arrays, and microspheres is a big issue among energy industries. The U.S. Energy Department has stated that hydrogen compression and storage problems are a major obstacle in the commercialization of hydrogen cars, trains, ships, drones, bus, and trucks. The conventional piston compressors have many moving parts requiring lubrication and service to prevent wear. In addition, hydrogen is about 16 times lighter than air, combustible and is difficult to compress and store safely due to leakage. The conventional compressor must be delicately and finely machined to assure tight fit to prevent hydrogen gas from escaping into the surroundings. Excellent sealing is also essential for conventional compressor to prevent lubricants from contaminating the hydrogen gas. Hydrogen gas may be easily contaminated resulting in substandard performance and increased costs. These are contaminants typically include $CO_2$, $N_2$, $O_2$ as well as other gases in the working environment. These issues remain a problem for hydrogen filling stations and even for power plant generators.

The costs of transportation, equipment maintenance, renting cylinders for storage, operating cooling generators may be prohibitive to developing machinery for a future hydrogen economy, as these systems will have to handle up to thousand cubic meter of hydrogen per day. A device which may be made inexpensive, with no moving parts, and requires very little maintenance may advantageously overcome these current limitations in these systems.

The laser driven plasma-shock-acoustic wave compressor described herein resolves many if not all these problems and critical issues. The disclosed subject matter replaces the metal piston of a conventional compressor and hydrated electrochemical with a specially pulsed laser to provide the compressive energy. Pressure from plasma generation provides the compression action. In the near term and beyond a large market potential in the hydrogen gas will be in providing portable fueling stations for buses, ships, drones, aircraft, trains, and automobile fleets. The discloses subject matter is ideally suited for use in small portable fuel pumping that may be great benefit to consumers. Additionally, the disclosed subject matter when used in series or parallel may achieve greater scale and application.

The potential applications of the disclosed subject matter, such as the charging of fuel cells, airbags, replenishment for cooling power plant generator, production of ethylene and in die-casting processes exists where conventional compressor types have long dominated. A wide variety of electronics manufacturers use hydrogen as a carrier gas for thin-film deposition, cleaning and as a reducing agent in furnace treatments. Another advantage of the disclosed subject matter is that it makes very little noise and has a smaller footprint along with reduced weight compared to current compressing devices and methods. Lower capital costs, increased safety benefits and the reduction of operating cost of the disclosed subject matter in comparison with hydrogen cylinder rental, and cylinder handling will greatly benefit all users. The resultant compressed gas (H, O, $CO_2$, $N_2$, etc.) for the disclosed subject matter may be used for energy carriers, fuel resources, cooling systems, heat engines, semiconductor manufacturers, fuel cells, fireless steam energy, magnetohydrodynamic (MHD) power generation, magnetoplasmadynamic (MPD) power generation, electroplasmadynamic power generation, and many other potential applications.

One such application is a EPD Capacitor (plasma capacitor). The laser driven plasma-shock-acoustic wave compressor loses energy in form of a strong magnetic field generated when plasma is formed. This Plasma Capacitor, is able to convert energy in an ionized gas flow into electrical energy without utilizing bulky magnets/electromagnet coils at much lower cost, weight, complexity, and size. Plasma Capacitor generator is better than bulky DC and AC MHD generators or even Hall Disk generators. Using ultrashort laser technology based on magnetroplasmadynamic principle and/or an electrical discharge gap technology based on electroplasmicdynamic principles, shifts these paradigms of MHD technology.

SUMMARY

A gas compressor contains a gas inlet, a compressed gas outlet and a gas passage between a gas inlet and compressed gas outlet. The gas passage is made up of a first check valve biased against flow towards the inlet, a nozzle downstream from the first portion and having a focal point located within, a diffuser, a capillary connecting the nozzle and diffuser, a second check valve biased against flow towards the inlet and located between the diffuser and the gas outlet, a storage chamber downstream of the second check valve, and a pulsed laser configured to direct a beam upon the focal point.

Hydrogen is ideal for the compressor due to its simple structure. When designed for 2 dimensional flow each of the first and second check valves comprise a plurality of successive triangular chambers. For both two dimensional and three dimensional flow the first and second check valves, nozzle, capillary, and diffuser are concentric with a central axis. The pulse laser is configured with one or more elements from the group comprising fiber optics, mirrors and lenses. The pulse laser may contain a plurality of lasers configured to direct respective beams upon the focal point.

The storage chamber may be a core surrounded by an outer shell, which may be in thermal communication with a heat sink. The core further has a plurality of grooves which interface with the outer shell to form a third portion of the gas passage. The core may make use of a plurality of tunnels thru the core, which connect the plurality of grooves, and are in fluid communication with the plurality of grooves.

At least one of the first and second check valves produce a portion of the gas passage defined between an inner conical surface and an outer conical surface. In a two dimensional embodiment, at least one of the first and second check valves comprise a portion of the gas passage having plurality of successive wedge shaped chambers having a constant thickness.

Gas compression occurs by, first providing gas at a first pressure at a focus area in a nozzle downstream of a first set of check valves and upstream of a diffuser; then pulsing a laser beam on the focus area; which results in transforming gas at the focus area into plasma; thus forming a shock wave that expands in all directions; which is controlled by restricting upstream flow by the first set of check valves; this results in advancing the shock wave downstream through a second set of check values downstream of the diffuser; causing the effect of pumping gas through the second set of check valves via a pressure gradient caused by the shock wave; this is further controlled by restricting upstream flow with the second set of check valves; and, finally resulting in accumulating gas and plasma in a storage chamber downstream from the second set of check valves and transferring heat away from the chamber; this is possible without moving parts because the first set of check valves, nozzle, diffuser, second set of check valves and chamber are in fluid communication.

The method may require filtering out undesired laser beam wavelengths prior to the focal area. If desired the method may make use of focusing a plurality of laser beam upon the focus area. This may be accomplished by directing the laser beam to the focus area by one or more of the group consisting of mirrors, lenses, and fiber optics. The method enables a condition wherein the first pressure is lower than an inlet pressure and the chamber pressure is greater than the inlet pressure. The method of controlling flow direction involves restricting upstream flow by generating vortices within each set of the check valves. Shock wave formation is achieved rapidly expanding the gas and plasma.

A hydrogen gas compressor contains a gas inlet; a compressed gas outlet; a gas passage between a gas inlet and compressed gas outlet. The gas passage is made up of a first check valve biased against flow towards the inlet, consisting of a first portion of the gas passage defined by a series of conical surfaces and an outer stepped conical surface; a nozzle downstream from the first portion and having a focal point located within and connected to a diffuser by a capillary, the nozzle, capillary and diffuser being concentric with the conical surfaces of the first check valve; a second check valve biased against flow towards the inlet and located between the diffuser and the gas outlet; the second portion of the gas passage defined by a second inner stepped conical surface and a second outer stepped conical surface; the steps of the inner and outer conical surfaces are axially offset from one another; a compressed hydrogen gas storage chamber made up of a core with a plurality of grooves surrounded by an outer shell and a plurality of tunnels defined through the core interconnecting ones of the plurality of tunnels; a femtosecond laser configured to direct a beam upon the focal point; and a band pass filter positioned between the laser and the focal point; the first check valve contains an optical passage from the pulse laser to the focal point.

BRIEF DESCRIPTION OF DRAWINGS

FIG. 4A. Depicts the spiral groove embodiment of the storage module core.

FIG. 4B. Depicts the tunnel alignment of the spiral storage module core.

FIG. 4C. Depicts the helical pattern of the tunnels for spiral storage module core.

FIG. 12. Depicts an embodiment of the capacitor system installed within an Ultrashort laser driven plasma shock compressor.

FIG. 15A. Depicts an Axion lens for use in a dual laser system.

FIG. 15B. Depicts a parabolic mirror lens for use in a dual laser system.

FIG. 15C. Depicts a two lens arrangement for use in a dual laser system.

FIG. 15D. Depicts a dual focal point lens for use in a dual laser system.

FIG. 15E. Depicts a combination of a prism reflector and dual focal point lens for use in a dual laser system.

Figure 1:
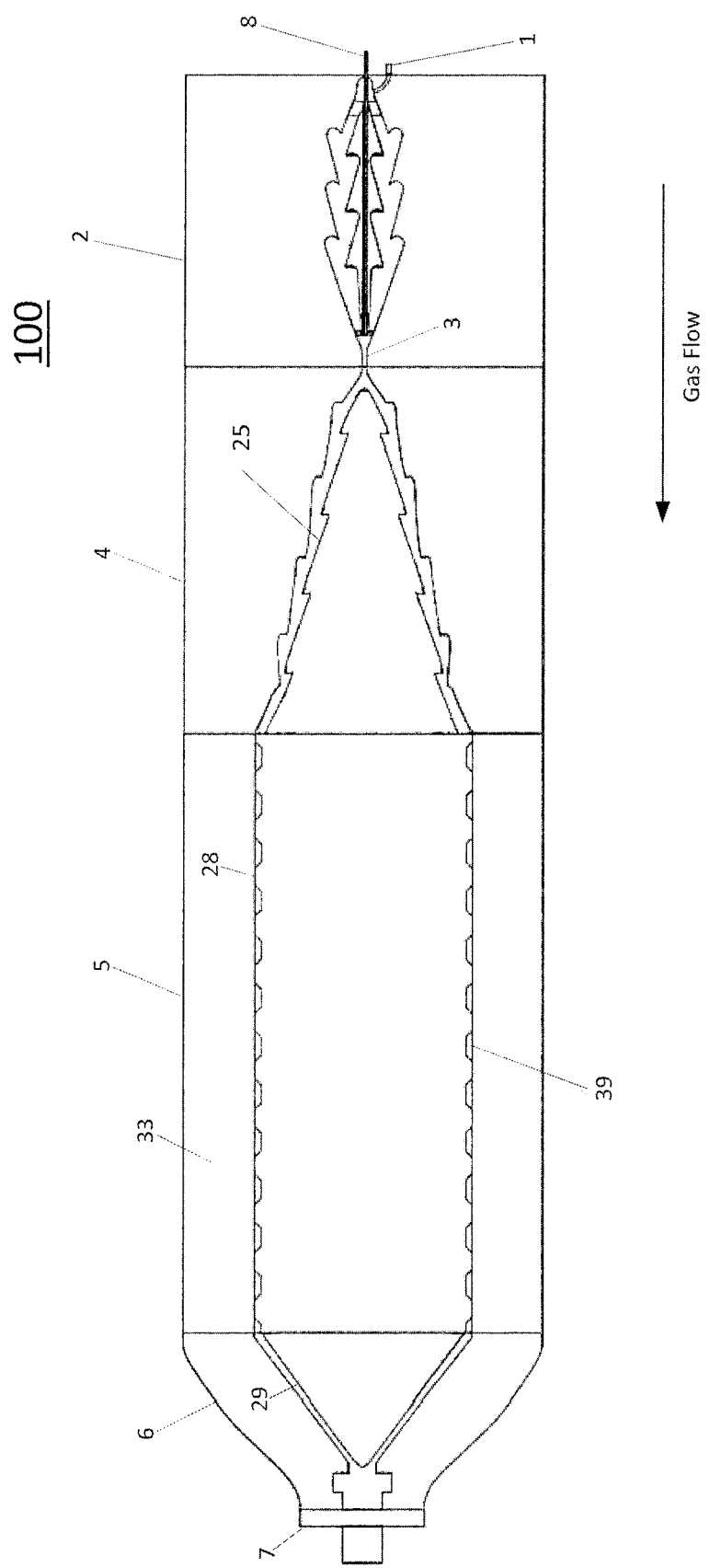
FIG. 1. Depicts an embodiment of the plasma shock compressor depicting the four chambers of the compressor.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies in gas compression systems and methods. More specifically, the present disclosure is directed to systems and method of compressing hydrogen through plasma generation, precluding the need for rotating machinery.

A component of the disclosed subject matter is the application of a pulsed laser. A femtosecond laser is a laser which emits optical pulses with a duration well below 1 ps (→ultrashort pulses), i.e., in the domain of femtoseconds (1 fs=$10^{-15}$ s). A femtosecond laser module operates using a small energy to produce tiny thermonuclear detonation. This creates supersonic exothermic front accelerating through a medium that eventually drives a shock front propagating directly in front of it. The laser-driven mechanism contains a laser oscillator module, pulse picker, isolators, chirp pulse amplification, partial mirror reflector, beam dump, and lens focusing components or fiber optics.

Most femtoseconds pulse laser modules come with a typical fixed repetition rate of a few MHz. However, in the disclosed compressor a pulse picker with a high voltage (HV) power supply, RF electronic controller, and pulse generator also work in conjunction with the pulse laser. Electro-optical modulators have crystal like rubidium titanyl phosphate, deuterated potassium dihydrogen phosphate, or beta barium borate, assembled together with the polarizer, and properly driven with the high voltage electronics, such that the pulse picker may select and transmit some of optical pulses from the pulse train and reject all others. The laser produces an ultrashort wavelength pulse, as a side note, tis ultrashort laser technology may open up the new Femtochemistry field and semiconductor switching. The femtosecond scale time typically requires optical technology since electronic technology is not able to respond near speed of light at terawatt target areas under controllable conditions. The laser beam energy or irradiance may be increased by the number of lens arrays or fiber core diameters (both should have high fill factor and/or be tiled) without losing the ability to support primarily single-mode pulse propagation. Using uniform irradiance and higher fill factor closer to 100 percent will produce better beam quality (increasing power-in-bucket) and high energy concentrated in the central lobe. The beamlets of array should be arrayed closely together and/or tiled at the output aperture. This method will produce near 100 percent of a fill factor. This is one set of beam arrays. The size of the capillary or small pipe may be increased by increasing the number of beam array sets. This method is not just focusing to one spot size, but also in several spots separately. Several spots on target area will detonate gas or liquid in much large area that creates plasma shockwave front. This array soliton sources produces (from several laser spot size target area) into Peregrine Soliton. This complex engineering is also not limited to different location of the array soliton sources (phenomenon effects from several spot size target area). It is possible to obtain 100-fs pulses or few fs pulses with an average power of up to 100 W or more by scaling up the present subject matter, or as described earlier numerous compressors by be arranged in series or parallel to reach scales required for some applications. The production of such high levels of average power will likely make ultrafast fiber laser technology the workhorse femtosecond laser system of the future.

In the disclosed subject matter, the focused laser interacts with the source hydrogen. The ultrashort pulse of the laser and the pondermotive force separate the hydrogen's protons and electron forming a plasma. When ultrashort laser pulse lasers are applied toward the target area, Ponderomotive force arises very significantly whenever there is a very high intensity gradient of pulsed laser light bullets of a few wavelengths width. The pressure exert as a result of these pulses is enormous. The pressure is an energy density. The standard of quantum mechanics in atomic-molecular of hydrogen start to change around greater than $10^{12}$ Wcm$^{-2}$ when applied to the ionization of atomic hydrogen in a laser field. This fast ignition gas (breakdown) is characteristic of intense laser-matter interaction. The speed of the plasma front may reach 100 km/s.

The plasma production proceeds in two steps. The first step is initial ionization, which may be accomplished in a gas by multi-photon absorption. After free electrons are produced, they are further heated by inverse bremsstrahlung resulting in a cascade process in which the energetic electrons produce further ionization by collision with the neutral atoms and ions. Once this latter stage is reached, the laser intensity required to maintain the plasma drops to a value equal to the loss rate from the plasma. This is typically of the order of a few kilowatts.

The absorption coefficient (in cm$^{-1}$) for inverse bremsstrahlung is given by:

$$\alpha = \frac{(7.8 \times 10^{-9})Z n_e^2 \ln \wedge (v)}{v^2 T_e^{3/2}(1 - v_p^2/v^2)^{1/2}}$$

where Z is the ionic charge, $n_e$ is the electron density in cm$^{-3}$, $\wedge$ is the high-frequency screening parameter, $T_e$ is the electron temperature in eV, v is the laser frequency, and $v_p$ is the plasma frequency. Coupling of the laser energy into the plasma is most efficient if the electron density of the plasma is such that $v_p$ is close to v. The absorption depth (i.e., the distance the laser radiation penetrates into the plasma) is given by $\alpha^{-1}$. Because of the strong dependence of $\alpha$ on the electron density and electron temperature, the plasma parameters may be varied to achieve maximum absorption of any laser radiation in a fixed distance. If the electron density of the plasma reaches the critical density given by:

$$n_c = (1.24 \times 10^{-8})v^2$$

then the laser beam does not penetrate into the plasma but is reflected instead. This situation results in a laser-supported detonation (LSD) wave propagating from the plasma surface along the laser beam toward the laser. These waves move at supersonic speeds and ionize and heat the medium through which they are propagating.

During an ultrashort time, laser light pulse travels only a distance of $\simeq 1.5$ μm in vacuum. This pulse duration is not per se a laser beam in the traditional sense, but rather a laser light bullet (however, the two terms are used herein interchangeably). The laser light bullet contains oscillation of electric field in group velocity, $\upsilon_g$. The Lorentz force on an electron exposed to a space varying electric field E(x,y,z). The time average of this non-linear force is given by:

$$F_{NL} = -\nabla U_p$$

where $$F_{NL} = -e[E(r,t) + \upsilon \times B(r,t)]$$

where $F_{NL}$ (Lorentz Force) is acting on a particle of electric charge e with instantaneous velocity $\upsilon$, due to an external electric field E and magnetic field. Note that there is no v×B force due to making dipole approximation that implies the omittance of the magnetic field.

Ponderomotive force is a nonlinear force that a charged particle experiences in an inhomogeneous oscillating electromagnetic field. This ponderomotive force is defined by gradient of ponderomotive energy. During focusing ultra-high intensity laser beam in plasma, two different ponderomotive forces are in action due to two different gradients. They are radial and longitudinal ponderomotive forces. Radial ponderomotive force on electrons is directed radially outwards.

$$F_p \propto -\nabla I$$

where I is the intensity.

This mechanism produces focusing bunches of electrons during acceleration against distance and time. Also, in time, the intensity is varying and there is longitudinal ponderomotive force on the electron in the direction of beam propagation.

This ponderomotive force due to the transverse electric field gradient of the laser beam will push the plasma electrons radially outwards, thereby creating a radial field which will focus the electron beam axially.

Note, if another laser pulse of same duration is injected instead of the e-beam at a lag of 1.5 $\lambda_p$, the wake field of this pulse will be opposite and will try to cancel out the field of the previous pulse. As a result, the energy of the photons in the second pulse will get increased. This is the concept of a Photon Accelerator. In this respect adding another laser beam at a different location using pulse trigger mechanism following lag pulse may be possible.

A longitudinal ponderomotive force as described above is defined as:

$$F_p \propto -\frac{\partial I}{\partial Z}$$

where I is the intensity.

These net ponderomotive forces are used in the concept of Laser Wake Field Accelerator. While the Electromagnetic field is in transverse and thus cannot be used to accelerate electrons, there are various ways to use transverse laser field to generate longitudinal field gradient to accelerate electrons. The laser is able to excite Langmuir wave in the plasma such as fast ignition and these are longitudinal waves. Hence, this mechanism as described may also be used to accelerate electrons.

In the disclosed subject matter, the net ponderomotive forces effect on gas medium act as an impulse piston that produces shock waves and compression waves at higher velocity and pressure along the boundaries conditions, such as a channel or capillary. From this "piston" corresponding to the motion of a gas is under the action of an impulsive load. A pressure pulse of ultrashort duration is applied to the external surface of the gas, whereas, the gas surface is subjected to an impulsive load. The compressive wave is then following behind the shock wave. The restricted flow valves (check valves) of the cone will reflect and deal with this extreme shock wave propagation.

The shock waves undergo dissipative processes such as acoustic and heating results. This is an important and necessary step for the shock wave gas compressor where the plasma bullet may further propagate beyond what is required for compression. The plasma density will also undergo dissipative processes as a function of time and distance. The impulsive piston load mechanism using plasma density at fast ignition using medium gas is only required and necessary in gas compressor processes.

As noted previously, a pressure pulse of ultrashort duration is applied to the external surface of the gas. The gas surface is subjected to an impulsive load. Ultrashort laser-driven mechanism is one of the various methods that are possible for producing an impulsive load. In ultrashort time interval, τ, a plane piston is pushed into a gas with a constant velocity $U_1$, creating a pressure $\Pi_1$ in the gas. The pressure is defined and given as:

$$\Pi_1 \approx \rho_0 U_1^2$$

where $\rho_0$ is the gas density depends on the specific heat ratio Y.

The velocity of the shock D=$u_s$ that is created by the action of the piston is close to $U_1$. After a time interval τ the piston is then instantaneously withdrawn.

A thin layer of coulomb explosive is detonated on the gas surface. When the mass thickness of the layer is m units of mass per unit of area and the energy released per unit mass is Q, the energy is released by the explosion per unit area is defined as:

$$E = mQ$$

The explosion products expand with a velocity $U_1 \approx \sqrt{Q}$. The products expand in both directions and since prior to the detonation the gas is substantially at rest, the total momentum is equal to zero. However, the momentum of the detonation products moving in one direction is in order of magnitude, equal to $I \approx mU_1 \approx m\sqrt{Q}$ (per unit surface area). The detonation products generate a shock wave in the gas with a pressure on the order of $\Pi_1 \approx \rho_0 U_1^2$. The time $\tau$ over which the pressure acts as determined from the condition that in the time $\tau$ the energy and momentum are transferred from the detonation products to the gas, $$\tau \approx \frac{E}{\Pi_1 U_1} \approx \frac{I}{\Pi_1} \approx \frac{m}{\rho_0 \sqrt{Q}}$$

During this time, the shock wave in the gas will travel through a distance $\sim U_1 \tau \sim (Q\tau)^{1/2}$ and will encompass a mass $\sim \rho_0 (Q\tau)^{1/2} \sim m$, a mass of the order of the mass of the explosive.

A thin plate with a small mass per unit area is made to strike the gas surface with a velocity $U_1$. The impact of the plate creates a shock wave in the gas which propagates with the velocity $D \approx U_1$. The pressure in the gas will then be $\Pi_1 \approx \rho_0 U_1^2$. The initial momentum and energy of the plate, $I = mU_1$ and $E = mU_1^2/2$, are transferred to a gas during the time $\tau$ in which plate is decelerated, which is the order of $\tau \approx E/\Pi_1 U_1 \approx I/\Pi_1 \approx m/\rho_0 U_1$. During this time, the shock wave in the gas travels through a distance $U_1 \tau$ and encompasses a mass, $\rho_0 U_1 \tau \approx m$.

There is pressure acting on the surface of the gas which drops rapidly with time. The pressure may be expressed in the form $p_p = \Pi_1 f(t/\tau)$ where f is a function which characterizes the shape of the pressure pulse. The "piston" concept will be used for this example. The motion of the gas may be determined using the functions p(x,t), p(x,t), and u(x,t) after a time is large in comparison with impact time $\tau$. The solution to this problem should answer the questions of how the pressure $\Pi_1$ must increase as $\tau \to 0$, in order to ensure that the pressure in the gas be finite after a finite time, t.

A plasma bullet will travel behind the shock and compression wave following in medium gas. However, the relativistic and non-relativistic of the shock wave depends on the strength of intensity of the laser-driven mechanism and the area of the target.

Note that $U_P$ is not the same energy comparison with $E = mQ$ due to the difference of pressure mechanism processes. In another words, the light radiation pressure from pulse light laser is a different mechanism from the detonation products (use gas medium) that cause "piston" acts as pressure on rest gas medium. $U_P$ produces powerful electrostatic force (acts dielectric similar to capacitor model) toward the plate of gas where $E = mQ$ produces into detonation products (atomic-molecular follows coulomb explosion) first and then acts as piston force that creates into shock wave process. However, $U_P$ is greater than or closer to $E = mQ$ where Q comes from $U_P$ process. This momentum process somewhat follows relativistic physics as quantum mechanism, too. This modeling may be adjusted using a plasma thruster design for much greater force.

The leftover plasma is still in process behind the shock wave where the higher radiation heat (shock) wave propagates upfront first. However, this plasma needs to be dissipative through radiation emissions, heat, and acoustic emissions safely along the boundary distance. Then, the plasma returns back to atomic-molecular recombination process while traveling along the boundary conditions.

The gas flowing through the check valve nozzle is forced by the pressure gradient from the passage confinement to an exit. At any point in the nozzle valve, the pressure upstream is greater than the pressure downstream. Hence, the general differential force or net accelerating force is also given as $$dF = pA - (p - dp)A \to dF = \tau dA$$

where $\tau$ is viscous pressure and dA is the differential area.

In the check valves, the flow is bias by the creation of vortices. The larger the vortex, the more resistance force is against the undesired direction of fluid flow. The momentum equation generally is used to calculate the reaction thrust of a fluid or gas jet is expressed as:

$$F = \rho Q v - F_R \to F \approx \iint_{A_b + A_f} p\hat{n} \cdot dA - p_{op} A_0 = \oint p dA - p_{op} A_0$$

where F is the thrust force, $\rho$ is the density of fluid or gas, Q is the measured flow rate, v is the mean velocity of the flow through the nozzle, $F_R$ is force resistance acting on check valve, $A_b$ is the back area of the high pressure chamber, $A_f$ is the front area of the high pressure chamber, p is the system pressure, $p_{op}$ is the operating pressure (the environmental pressure), $A_0$ is the outlet area of the conical nozzle, and A is unit vector tangent and normal to the differential area element dA.

Therefore, the total force includes the retarding (resistance) forces that are vortex force resistance (neutral force at nearly to zero unless greater viscous dissipation) and tank pressure is written generally as:

$$F = \oint p dA - p_{VR} dA_C - p_t A_e =$$

$$\oint p dA - \tau dA_C - p_t A_e \approx \iint_{A_v + A_f} p\hat{n} \cdot dA - \tau dA_C - p_{op} A_0$$

These complex equations are also similar and important as applied to conical valve thrust reaction force. Using Computational Fluid Dynamic (CDF) modeling simulator will help and determine the right parameters for these accurate results. These equations show the applied force from focus zone or containment glass must be greater than the retarding forces in order to accomplish the desired results.

The purpose of the check valves is to keep or reserve the shock pressure inside the containment glass before leaking toward exit outlet. Shock wave or impulse momentum force from laser beam is perpendicular to the exit force or outlet fluid flow. Therefore, the first response of laser induces shock wave or impulse momentum force is much faster than the response of exit gas or liquid flow output. Another possible way is to keep only pressure tank for resistance force, $-p_{op} A_0$, without using check valves. If the fluid is in reversing flows then the term, $-p_{op} A_0$ is increasing its resistance force.

A laser beam bore tube may be designed in different ways such as charging different type of gas element (higher gas breakdown characteristic) inside bore tube and seal with optical windows. This allows laser beam travel longer without any interfacing from nonlinear Kerr effects (breakdown at specific focus length than desired focus length).

The further detailed analysis shows that on two transverse dimension spatial solitons (time and distance) are unstable in a pure Kerr medium. These are also not limited to gas; liquid, and even solid material act as linear and nonlinear medium (refractive index). This may happen in self-focusing or focusing to unexpected ionization regions (ignited spot) at some distance and time during nonlinear beam propagation in any medium state. The solution to this limited damaged threshold material is resolved by engineering the right method of laser beams propagation target area toward the wall channel of the taper chamber safely and in a stable manner.

The disclosed subject matter using high power fiber or optic components with laser beams propagation method is dealing with limited damaged threshold target material. These issues are resolved by using gaseous medium surrounding the space region and a channel tube that may be used for reversal processes. Hence, it keeps its operation stable and continual at longer lifetime. There are several different wave equations to deal with these linear and nonlinear effect processes. The linear effect is the beam propagation model in which the effects of diffraction, group velocity dispersion (GVD), and the instantaneous and retarded Kerr effect include the higher order-order Kerr effect. The nonlinear effect is another beam propagation model for the nonlinear Kerr effect, plasma self-focusing and defocusing, and multiphoton absorption (MPA).

The model equation from Chiron, et. al paper did not use two dimensions (r,z) and time propagation [2-D+1 (time) propagation] model equation. Instead, their modeling deals with studying what consequence results would be from $\Delta N << N_o$. Since $N=kc/\omega$, it follows that $1/\omega <<1$ and thus the time dependent term is small. However, the pulse paraxial wave equation should be adding time dimension [2-D+1 (time)=3D modeling (r,z,t)] to determine the group velocity versus time and distance that may be simulated for channel modeling correctly.

The scalar envelope $\varepsilon(r,z,t)$ assumed to be slowly varying in time and along z and evolves according to the propagation equation. The Kerr effect beam for a cylindrical symmetry around the propagation axis z is written as:

$$\frac{\partial \varepsilon}{\partial z} = \frac{i}{2k_0} T^{-1} \left( \frac{\partial^2}{\partial r^2} + \frac{1}{r} \frac{\partial}{\partial r} \right) \varepsilon - i\frac{k'}{2} \frac{\partial^2}{\partial \tau^2} -$$

$$i\frac{k_0}{2\omega_0^2} T^{-1} [\omega_p^2(p)\varepsilon] + ik_0 n_2 T[|\varepsilon|^2 \varepsilon] - \frac{1}{2} \frac{\sum_q \rho_q W_q U_q}{|\varepsilon|^2}$$

where $\tau$ refers to the retarded time variable $t-z/v_g$ with $v_g = \partial \omega / \partial k_{\omega_0}$. The terms on the right-hand side of this equation account for diffraction within the transverse plane, group velocity dispersion with coefficient $k''=\partial^2 k/\partial \omega^2|_{\omega_0}$, defocusing due to the plasma with electron density $\rho$, self-focusing related to the Kerr effect, and absorption due to tunnel ionization. The operator $T=1+(i/\omega_0)\partial \tau$ in the nonlinear polarization gives rise to self-steepening effects and $T^{-1}$ in front of the diffraction term accounts for space time focusing. By taking this operator into account, the cross derivative $\partial^2 z$, $\tau$ which appears in the wave equation expressed in the reference frame of the pulse through the retarded time variable $\tau$. is taken into account. The nonlinear polarization parameter is important and explains using the susceptibilities values that describe the medium in saturated gas ionization.

The laser pulse is initially focused on the entrance plane of the channel tube of bore radius a (taper chamber). During this focusing stage, the Kerr effect propagation supplemented by the system charge densities and ionization rates equations describe the complete evolution of the laser pulse and the plasma created by photoionization, under the effects of diffraction, dispersion, plasma defocusing and absorption, self-focusing, self-steepening, and space time focusing. When the laser pulse reaches the entrance plane of the channel or capillary tube, the on-axis (r,a) part of its energy is projected on the different modes defined in the next section, while the off-axis (r,a) part is lost in the entrance wall of the wave guide.

This laser bore tube may be used with either fiber optics or without (use optic lens), one laser beam or an array of beams. The array beams may be done in several different methods such as using multi-fibers or lens array components, parabolic mirror or right angle mirror, and focusing lens. The focus lens may be designed in different ways such as collimator, beam expander, and air-spaced achromatic doublets or triplets lens to meet desired output spot size at excellent beam quality. Doping fiber, hollow core fiber, or Bragg grating fiber may be used inside laser bore hole of the check valve device. The diffuser shape may be designed to minimize turbulence, and probe laser target area requirements. The method of man-made turbulence gas flow is another option that may be designed to act as a self-focusing lens for ultrashort laser beam. This phenomenon effect may be done with self-focusing lens by changing the index refraction that depends on the dynamic density of gas flows. This mechanism is another option for self-focusing and then de-focusing at limited desired distance. This may work using either focusing or Kerr effect propagation. Using either one beam or arrays beams may deal with gas turbulence in the target area.

Laser prism mirrors have multilayer dielectric coating which have higher damage threshold, durability, better mechanical hardness. Also, laser prism mirrors usually are at 45 degree angle for higher reflection than the metallic coating mirrors.

This is another possible option that would help gas inlet tube flow faster and straighter easily. Check valve chamber may be designed and use different gas filled chamber for high power laser beam. The purpose of this method is to prevent gas breakdown and thermal management before reaching longer target distance area. This would help to minimum gas filament generation. The focus length will be determined to meet the threshold gas breakdown before reaching its longer focus target area.

The laser-induced plasma generation is produced by focusing the pulsed laser beam onto a small volume of gas. When the electric field of the laser radiation near the focal volume exceeds the field binding the electrons to their respective nuclei, it triggers breakdown of the gas molecules and ionizes the gas in the focal volume. The resulting plasma is opaque to the incident laser radiation and absorbs more energy, resulting in further ionization. This generates a cascade effect. Energy is preferentially absorbed towards the laser source, and hence an elongated tear-drop shaped spark is produced at the end of the laser pulse. The collision of energetic electrons with heavy particles heats the gas. The resulting de-energized electrons recombine with heavy particles, and the electron number density decreases as a result. Very high temperatures and pressures are obtained at the end of plasma formation. The resulting pressure gradients cause a blast wave which then propagates into the background gas. As the blast-wave propagates into the background, it poses an interesting fluid dynamic problem. The blast wave is initially tear-drop shaped but becomes spherical as it propagates. During this period, the strength of the blast wave varies over two orders of magnitude. The flow field behind the blast wave results in rolling up of the plasma core, and formation of toroidal vortex rings.

The flow field resulting from laser-induced breakdown in isotropic turbulence is simulated using the compressible Navier-Stokes equations. Ghosh and Mahesh present the details of numerical method and the equations of the conservation of mass, momentum, energy, the continuity equation, Ducros limiter and variable, vorticity, velocity magnitude and pressure, turbulence, and shock formation that may be written for simulating plasma-shockwave propagation modeling. This would happen inside the wall channel of the check valve chamber.

The work done from the shock wave propagating against the internal pressure (Young modules of glass capillary and bulk module of gas or fluid) in the confinement of cold materials has been dissipated and loses its energy. This work done also resists compression materials confined by geometry (either gas or fluid). The distance of dissipation at which the shock wave stop defines the boundary of the shock affected area. At this stopping point, the shock wave converts into an acoustic wave (sonic). This sound wave propagates further into the material without inducing any permanent changed to solid materials. Eventually, this acoustic wave at resistance of Young modulus materials (tensile and compressive) convert into impulse momentum of shock wave.

The internal energy in the whole volume enclosed by the shock front uses the distance where the shock wave stop may be following to the absorbed energy:

$$E_{abs} \approx \frac{4\pi P_0 r_{stop}^3}{3} \Rightarrow r_{stop} \approx \left(\frac{3E_{abs}}{4\pi P_0}\right)^{1/3}$$

This equation determines the stopping distance obtained from the boundary conditions of cylinder confinement. At this point, the pressure behind the shock front is equal to the internal pressure of cold gas or fluid. The boundary between the laser affected on gas or fluid and glass confined corresponds to the radius distance where shock wave effectively stopped.

The acoustic wave continues to propagate at $r > r_{stop}$. This propagation wave is not affecting the properties of confinement and lens materials at its radius distance. Laser beam toward the gas or fluid filled capillary at target focus volume produces a hollow or low density region surrounded by a shell of the laser-affected material. This creates a void region spot. The strong spherical shock wave starts to propagate outside the center of symmetry (at target center of circle explosion) of the gas or fluid absorbed energy region. This micro explosion produces to compress the gas or fluid against the glass confinement. At this same time, a rarefaction wave propagates to the center of symmetry decreasing the density in the area of the energy deposition along the axis of laser beam target.

At this point, a strong spherical explosion is produced where gas or fluid density decreases rapidly in space and time, behind the shock front in direction to the center of symmetry of the glass confinement. The entire mass of gas or fluid inside the confinement material that spread at uniformly in the energy deposition region inside a sphere of radius, $r \sim l_{abs}$, is concentrated within a thin shell near the shock front at some time after the micro explosion. The gas or fluid temperature increases and its density decreases toward the center symmetry (circle) of shell confinement. The gas or fluid pressure is nearly constant along the radius. A void surrounded by a shell of laser-modified gas or fluid was formed at the focal spot. The whole heated gas or fluid mass is expelled out of the center symmetry and remains after shock wave unloading in the form of shell surrounding the void.

This is possible because the fluid or gas has a low dielectric breakdown strength compared to higher dielectric strength of glass confinement at the greater strength of laser electric field (intensity). The mass conservation is relating to the size of the void to compression of the surrounding shell. No mass losses will occur in this condition of the confinement. The void formation inside gas or fluid confinement happens only when gas or fluid mass contained in the volume of the void is pushed out and compressed.

Therefore, the entire mass of gas or fluid confined in a volume with radius $r_{stop}$ resides in a layer in between $r_{stop}$ and $r_v$, which has a density, $\rho = d\rho_0$ where $d > 1$.

$$\frac{4\pi}{3} r_{stop}^3 \rho_0 = \frac{4\pi}{3} (r_{stop}^3 - r_{void}^3) \rho$$

The compression ratio may be expressed through measured radius, $r_{void}$, and the radius of laser affected zone, $r_{stop}$, is given as:

$$\frac{r_{void}}{r_{stop}} = (1 - \delta^{-1})^{1/3}$$

The micro-explosion may be considered as a confined one when the shock wave affected zone is separated from the outer shell boundary of sapphire by the layer of thickness of fluid or gas. The gas or fluid boundary is larger than the size of this micro explosion zone. The thickness of gas or fluid layer should be equal to the distance at which laser beam propagates without self-focusing, $L_{s-f}(W/W_c)$:

$$L_{s-f} = \frac{2\pi n_0 r_0^2}{\lambda} \left(\frac{W_0}{W_{cr}} - 1\right)^{-1/2} = m r_{stop}$$

where W is the laser power, and $W_c$ is the critical power for self-focusing:

$$W_{cr} = \frac{\lambda^2}{2\pi n_0 n_2}$$

where $n_0$ is glass index of refraction, $n_2$ is gas index of refraction, and $\lambda$ is wavelength of laser.

The laser power is given as:

$$W = E_{las}/t_p$$

where $E_{las}$ is energy per pulse and $t_p$ is pulse duration.

The absorbed energy may be also expressed as:

$$E_{abs} = AE_{las}$$

where A is focus spot area.

Therefore, the radius of shock wave affected zone is connected by the equation:

$$r_{stop} \approx \left(\frac{3AWt_p}{4\pi P_{cold}}\right)^{1/3}$$

For conditions considered above, the maximum pressure for gas or fluid may be achieved safety on absorption volume confined inside the transparent crystal glass. This may be done without damage to the structure boundary of glass containment. Materials other than glass are also envisioned for the containment.

The maximum laser power at which micro-explosion remains confined and self-focusing does not affect the glass between the laser affected zone and gas or fluid boundary:

$$\frac{2n_0 \pi r_0^2}{m\lambda}\left(\frac{4\pi P_{cold}}{3AW_c t_p}\right)^{1/3} = \left(\frac{W}{W_c}\right)^{1/3}\left(\frac{W}{W_c}-1\right)^{1/2}$$

There is another effect in the focal zone that may influence the size of the volume absorbing the laser energy at laser fluence above the optical breakdown threshold. The intense beam with the total energy well above the ionization threshold valve (fluid or gas) reaches the threshold value at the beginning of the pulse. Laser energy increases and the beam cross-section where the laser fluence is equal to the threshold value of fluid or gas and glass, the ionization front, starts to move in the opposite to the beam direction. The beam is focused to the focal spot area, $S_f = \pi r_f^2$. The spatial shape of the beam path is a truncated cone with the intensity bounce out at any time. This gives fluence a direction independent of the transverse flow.

The threshold fluence is produced with a radius increasing at the beam cross-section as given:

$$r(z,t) = r_f + z(t) tg\alpha$$

where z is the distance from the focal spot, $r_f$ is a circle with radius, $\alpha$ is the angle between z and truncated cone of fluence, g (radiative) is the electrons diffusion rate where the first is the diffusion of electrons out of the focal volume.

During the pulse, the threshold fluence is given as [5]:

$$F_{thr} = \frac{E_{las}(t)}{\pi r^2(z,t)}$$

The ionization front moves the distance is given as:

$$z(t_p) = \frac{r_f}{tg\alpha}(f^{1/2}-1)$$

The ionization time may be evaluated as:

$$t_{ion} = t_p\left[1-\left(1-\frac{1}{f}\right)^{1/2}\right]$$

where f is the dimensionless parameter that is given as:

$$f = \frac{E_{las}(t_p)}{\pi r_f^2 F_{thr}} = F_{las}/F_{thr}$$

This simple geometrical consideration is the ratio of the maximum fluence to the threshold fluence. The measured result voids in sapphire is slightly elongated that give $z_m = 0.67 r_f$. For silica, $z_m = 0.47 r_f$. The negative effect is that the ionization front motion at the laser energy well above the ionization threshold leads to a large decrease in the absorbed energy density. The maximum fluence should be known for this applied modeling.

A nozzle is a simple device comes with a throat size at convergent-divergent configuration. The throat size is chosen to choke the flow and set the mass flow rate through the restricted flow valve chamber. The valve chamber has throat volume between converging and diverging nozzle that may be determine benefit to the thrust velocity from the region of focal volume at higher heat and pressure at ultra-short pulse. The gas flow in the throat is sonic which means the Mach number is equal to one in the throat.

Downstream of the throat, the geometry diverges and the flow is isentropically expanded to a supersonic Mach number. This depends on the area of ratio of the exit to the throat. The expansion of a supersonic flow causes the static pressure and temperature to decrease from the throat to the exit. The amount of expansion also determines the exit pressure and temperature. The exit temperature determines the exit of speed of sound which determines the exit velocity. The exit velocity, pressure, and mass flow through the nozzle determine the amount of thrust produced by the nozzle. The focus volume accelerates toward the conical valve and squeeze into the throat of chamber. Then it expands into divergence chamber for compression stage.

The conservation of mass explains and describes why a supersonic flow accelerated in the divergent section of the nozzle while a subsonic flow decelerates in a divergent duct. The mass flow rate equation is given:

$$\dot{m} = \rho VA \rightarrow \text{differntiate} \rightarrow VAd\rho + \rho AdV + \rho VdA = 0$$

where $\dot{m}$ is mass flow rate, $\rho$ is the gas density, V is the gas velocity, and A is the cross-sectional flow area.

Divide by $\rho VA$ to get conservation of mass equation:

$$\frac{d\rho}{\rho} + \frac{dV}{V} + \frac{dA}{A} = 0$$

Then, use the conservation of momentum equation:

$$\rho VdV = -dp$$

An isentropic flow relates to:

$$\frac{dp}{p} = \gamma \frac{d\rho}{\rho} \rightarrow dp = \gamma \frac{p}{\rho} d\rho \rightarrow dp = \gamma RT d\rho$$

where $\gamma$ is the ratio of specific heats and the equation of state is given as following:

$$\frac{p}{\rho} = RT$$

where R is the gas constant and T is temperature

The expression from these equations, $\gamma RT$, is the square of speed of sound, a, is given as:

$$dp = a^2 d\rho$$

For the change in pressure with the momentum equation, use this equation to obtain momentum and mass:

$$\rho V dV = -(a^2) d\rho \rightarrow \frac{V}{a^2} dV = -\frac{d\rho}{\rho} \rightarrow -(M^2)\frac{dV}{V} = -\frac{d\rho}{\rho}$$

where M=V/a.
The value of $$\frac{d\rho}{\rho}$$

is substitute into the mass flow equation:

$$-(M^2)\frac{dV}{V} + \frac{dV}{V} + \frac{dA}{A} = 0 \rightarrow (1-M^2)\frac{dV}{V} = -\frac{dA}{A}$$

However, this equation tells how the velocity V changes when the area chamber changes. The result depends on the Mach number M of the flow. If the flow is subsonic, then m<1 and the term multiplying the velocity change is positive $(1-M^2>0)$. Then an increase in the area $(dA>0)$ produces a negative increase (decrease) in the velocity $(dV<0)$.

If the gas flow in the throat is subsonic, the flow downstream of the throat will decelerate and stay subsonic. If the converging section is too large and does not choke the flow in the throat, the exit velocity is very slow and doesn't produce much thrust. And if the converging section is small enough that the flow chokes in the throat, then a slight increase in area causes the flow to go supersonic. For a supersonic flow (M>1), the term multiplying velocity change is negative $(1-M^2<0)$. Then an increase in the area $(dA>0)$ produces an increase in the velocity $(dV>0)$.

For supersonic (compressible) flows, both density and the velocity are changing as the area changed in order to conserve mass. The equation is given as:

$$-(M^2) dV/V = d\rho/\rho$$

This tells that for M>1, the change in density is much greater than the change in velocity. To conserve both mass and momentum in a supersonic flow, the velocity increases and the density decrease as the area is increased. This result concludes that the gas flow may be made into compressible core storage at greater force in oneway flow direction.

Hot plasma inside the channel is created when laser intensities have the range of $10^{12}$ W/cm²<$I_L$<$10^{16}$ W/cm² at femtoseconds pulse duration. This plasma exerts a high pressure on the surrounding material (glass tube channel under boundary condition protect with or without magnetic field shield). The formation of an intense shock wave is moving into the interior of the channel which toward to target area. The momentum of the out-flowing plasma of the channel balances the momentum imparted to the compressed medium behind the shock front. It is similar to a rocket effect. The ablation pressure is dominant when laser irradiances, $I_L$, is less than $10^{16}$ W/cm². In this last case, the pondermotive force drives the shock wave. This is non-relativistic shock wave. And if apply $I_L>10^{21}$ W/cm², then it is a laser induced relativistic shock wave.

The non-relativistic or also relativistic one dimensional shock wave is described by five variable parameters. They are the particle density n or the density $\rho=Mn$ where m is the particle mass, the pressure P, the energy density e, the shock wave velocity $u_s$ and the particle flow velocity $u_p$.

The strength of fluence depends on the ultrashort pulse duration of the laser frequency operation. Fluence is using laser pulse operation where intensity is typically or generally used for laser continued wave (CW) operation. The pulse irradiance affects either the strength of the non-relativistic or relativistic shock compressed plasmoid waves.

The capacitor model for laser irradiances, $I_L$ where the ponderomotive force controls the interaction. The parameters are $n_e$, $n_i$, $E_x$, and $\lambda_{DL}$, for the capacitor model where $n_e$ and $n_i$ are the electron and ion densities respectively, $E_x$ is the electric field, and $\lambda_{DL}$ is the distance between the positive and negative double layer (DL) charges. The system of the negative and positive layers is called a double layer. The neutral plasma is the electric field decays within a skin depth $\delta$ follows by DL geometrically and a shock wave is created. The shock wave is description in the position model. $\beta$ is important parameter to determine the strength of piston force driven mechanism where $u_p$ and c is particle flow velocity and speed of light respectively.

When the shockwave leaves the check valve chamber, the pressure drops within the check valve chamber allowing low pressure hydrogen to refill the check valve chamber in preparation for the next laser pulse. Each subsequent laser pulse repeats the process producing a near constant flow rate of hydrogen.

Beam dumps may be used in water-cooled and air-cooled configurations with reflective mirror and require adding optical isolator for laser. The purpose of the beam dump is to create an "infinite internal trap" of laser beam energy. This beam dump device is valuable and useful for creating wake plasma mechanism.

Also, the wake plasma design is not limited to tile angle of the second laser beam to excite the first plasma. This mechanism is to accelerate the plasma further distance and greater force and pressure.

These methods are possible options, but it is preferred to use the method of the Helmholtz Coils. They are a much better way to squeeze plasma into accelerator, greater force with external plasma capacitor circuit, and a simple low cost design.

Vortex arrays induce some streamlines velocity (self-induced motion) toward compress core storage. The hydrogen and plasma are forced through the restrictive flow chamber along the complex path with each successive shockwave caused by the laser pulses into the storage chamber.

Core storage has many tunnel holes along its groove patterns. Some regions are off limits to avoid the highest pressure at areas of high stress concentration. All tunnel holes (30) are in spiral step similar to helix structure.

These designs produce large volumetric and low gravimetric capacity. In other words, the core storage produces more energy density at lower weight for compressor.

Recall that if the flow is perpendicular to the Cone Valve (CV) boundary at each inlet and outlet, $\cos \theta_{VA}$ is 1 at the outlets and −1 at inlets. This is also:

$$\dot{E}_{mom} = \sum_k \left[ (\rho Q \vec{V})_{Outlets} - (\rho Q \vec{V})_{Inlets} \right]$$

If the fluid is incompressible, ρ is taken outside of the summation signs in any equations. Therefore, if the fluid is incompressible and the CV has only one inlet and outlet, then $Q_{in}=Q_{out}$.

$$\dot{E}_{mom} = \rho Q(\vec{V}_{out} - \vec{V}_{in})$$

This is still applied for core storage for gas inlet and outlet flows at perpendicular of groove patterns except for inlet and outlet of cone valve and exhaust chamber, respectively. These will lead to some momentum force loss toward the different of angle of groove patterns. The purpose of this design intention is to slow down the velocity flows and help heat management toward the core storage and output of the core storage.

This is an example of one spiral staircase per groove. Core storage will have many spiral staircase in every groove pattern to increase volumetric capacity and decrease the graviatmetric capacity. Also, another reason for using different angular groove pattern cores is to damp mechanical structure vibration, strengthen mechanical structure support, thermal shock, and flow control via pulsed plasma pressure at low cost design. The groove patterns guide the hydrogen flow toward the tunnels and help reduce plasma pressure.

Several manufacturer methods may produce small and large glass hole core storage parts. One of these options is laser drilling holes. A microdrilling with diameter in the range of less than 50 μm may be performed with high aspect ratio by UV laser ablation in glass as well as in other materials. Other groups have done this in many attempts using laser drilling to achieve high aspect 600 to 1. The end of drilling is characterized by stationary hole profile which may be detected by the limit hole depth l. This depth l is expressed as a function of the fluence F incident on the glass by:

$$\mathcal{H}(F) = z_o \left[ \left[ 1 + 2\left(\frac{F}{F_\infty}\right)\left(\frac{r_0}{z_0}\right) \right]^{1/2} - 1 \right]$$

where $r_0$, $z_0$, and $F_\infty$ are respectively the hole radius, the distance of the focal point to target surface and the fluence threshold for material removal.

The depth glass for UV laser drilling may go up to 18 mm (0.71 inches) of deep holes. The benefit of using this UV Laser drilling on glass is that the process does not depend on the hardness or electrical conductivity of the material, is capable of producing smaller holes at angles of up to 80 degrees from the perpendicular and higher aspect ratio holes, does not subject the material to mechanical stress, the processing time is short for hundreds or even thousands holes, and the laser beam cannot break like a drill and ruin the part.

This useful tool provides a greater opportunity to manufacture small preformed glass core storage effectively that may be assembled in arrays for the cascade compressor storage system. Eventually, an advanced technology machine tool will enable manufacturers to produce larger core storage parts using laser drilling methods. Existing machining tools are able to create any shape and groove dielectric materials (glass) parts via molding, laser cut and drilling machining (3 to 9 axis), and hybrid laser with hydrofluoric acid bath and ultrasonic (etched away).

The concept of an exhaust cone design helps to produce more laminar flow smoothly and quickly for exhaust output of gas connector. Also, the exhaust cone is used to more effectively refill and dispense hydrogen gas. The exhaust gas from the groove pattern of the core storage will enable rotation toward the exhaust cone output.

The Reynolds number indicates the relative significance of the viscous effect compared to the inertia effect. It is a useful and important tool in analyzing any type of flow when there is substantial velocity gradient (shear). The Reynolds number is proportional to inertial force divided by viscous force. The flow is laminar when Re<2300, transient when 2300<Re<4000, and turbulent when 4000<Re.

In order to generate an intense high voltage pulse from plasma capacitor, pre-plasma flow must activate, transfer, and absorb high power fluxes in between the capillary (plasma channel tube) and the dielectric medium of the capacitor energy. The gas denotation product produces an intense radial magnetic, radiation emission, an axial electric field along, and an intense charged particle beam directed through the shock reflecting tube.

The standard equation for the current in plasma against plasma partial velocity to current pulse and transform to final current pulse against radius of capillary and time is given as:

$$I = nev \rightarrow I(t) = I_0 \phi\left(\frac{\pi t}{t_0}\right) \rightarrow I_0 \sin\left(\frac{\pi t}{t_0}\right) \rightarrow 2\pi \int_0^{R_0} jr\,dr = 2\pi\sigma_0 E \int_0^{R_0} T^{3/2} r\,dr$$

where n equals the number of particles in a given volume of plasma, e is the charge of an electron, v is the velocity of the plasma particles, the electric current density is equal to $j=\sigma_\perp E$, T is equal to the temperature of the glass wall, the electric conductivity is $\sigma_0$, $r=R_o$ is the radius of the glass capillary, and E is voltage. The current result is compute and substitution from T equations and integration the boundary conditions. The current is rewritten as:

$$I = 2\pi R_0^2 E A^{3/2} \sigma_0 \int_0^1 u^{3/7}(\xi)\xi d\xi = 2\pi R_0^2 E A^{3/2} \sigma_0 |u'(1)|$$

where |u'(1)|=−0.107 based on with boundary conditions that is found numerically and presented the graph from Bobrova et al work. This equation result is computed and rewrite into capillary voltage given as:

$$E[kVcm^{-1}] = \frac{1}{7^{3/10} 2^{1/10} \pi^{2/5} |u'|^{2/5}} \frac{k_0^{3/10}}{\sigma_0^{7/10}} \frac{I^{2/5}}{R_0^{7/5}} \approx 0.085 \frac{I[kA]^{2/5}}{R_0[mm]^{7/5}}$$

Hence, the glass capillary is equivalent to current, I=E/R, where the voltage and resistance R per unit length of the plasma is given from E=IR and is equal to $$\mathcal{R}[\text{ohm cm}^{-1}] \approx 0.085 I[kA]^{-3/5} R_0 [\text{mm}]^{-7/5}$$

where $R_0$ is the radius of glass capillary.

In case of current pulse using time frame equation, the current is rewritten to:

$$I(t) = I_0 \sin\left(\frac{\pi t}{t_0}\right)$$

where $$I_o = \sqrt[5]{(ER_0)/0.085}$$

The capacitor energy is then equal to U=½(C×V²) where V is the capillary voltage driven. Hence, U=½(ΔC)V² ↔ ½C (V)² where C depends on the dielectric constant materials with permittivity and gas as boundary conditions (without plasma velocity) and ΔC depends on the increasing electrical conductivity during the pulsed plasma velocity.

Laser beams targets may be adjusted in scale from micro fab glass to macro cylinder devices using different methods of optical components such as beams and diode arrays, increasing core of the fiber, number of lens array, number of fibers, etc.

When voltage is driven by plasma applied to the above circuit, a charging current flows through the limiting internal resistance metal material of wire or bus, it is charging the capacitor and increasing its voltage. When the voltage reaches a certain level, the small gas filled tube has a breakdown or firing voltage (use either spark gap trigger or laser photoconductive switch device) which is less than that of the charging supply. When the capacitor's voltage reaches this threshold, the small gas filled tube ionizes internally, becoming conductive, and illuminates. This discharges the capacitor and is reducing its voltage. When that voltage falls below what is necessary for the small gas filled tube to stay lit, it goes out and returning to a non-conducting state. The capacitor begins to charge once more, and the process repeats indefinitely, making a simple oscillator, which depends on laser pulse frequency.

This capillary discharges with much greater current densities at typically peak currents of several tens of kA in a pulse of tens of nanosecond duration. These processes are able to form a plasma channel by the pinch effect. This type of capillary discharge may be operated in either initially-evacuated capillaries or gas-filled capillaries. The channel may be formed either in the initial compression phase of the discharge, or after reflection of the shockwave at the capillary axis when the plasma is in dynamical and thermal equilibrium with the walls of the capillary.

Three different techniques to produce plasma flows are ultrashort pulsed laser, plasma discharge gap using two electrodes, and dielectric barrier discharge device. Two different methods to produce shock wave pressure are ultra-short pulsed laser and plasma discharge gap using two electrodes. The purpose of using dielectric barrier discharge device is to produce a powerful, bigger size (increasing diameter of cylinder), and allowing fast plasma flows at straight line via electro-laser as waveguide.

The ultrashort pulsed laser focuses the target area at much greater energy. This drives gas medium into dielectric breakdown and then induces a circular electrical field in the gas, ionizing it and causing charged particles (free electrons and ions) to revolve in the opposite direction as the original pulse of current. Because the motion of this induced current flow is perpendicular to the magnetic field, the plasma is accelerated out into glass capillary by the Lorentz force at a high exhaust velocity.

Plasma discharge gap uses two electrodes at some length. This drives gas medium into dielectric breakdown and then induces a circular electrical field in the gas, ionizing it and causing charged particles (free electrons and ions) to revolve in the opposite direction as the original pulse of current. Because the motion of this induced current flow is perpendicular to the magnetic field, the plasma is accelerated out into glass tube channel by the Lorentz force at a high exhaust velocity.

The mechanism of the plasma discharge gap contains two conductive electrodes separated at great distance. These two electrodes are connected and using with a high voltage discharge circuit. Two electrodes are placed in wider gap at some distance that allows ultra-intense laser beam (electron carrier waveguide). Each electrode may be made in any geometric shape to meet specification depends on design applications. For an example, one positive electrode has short concentric cylinder. Second negative electrode consist sphere or cone shape. Both electrodes are either made in conductor or semiconductor materials. Semiconductor or insulator coatings may be also applied on electrodes such as glass coating with metal material. The plasma flows start from positive to negative electrodes respectively. Also, this flow may be reversed by changing polarity of electrodes. For an example, powerful lightening during thunderstorms always has its own crook path (zig-zag) from cloud to earth ground. However, using the electro-laser waveguide is the better solution to deal with plasma crook flow problem and high voltage arc gap issues (also deal with creepage clearance design) for the plasma capacitor device and even for the gas compressor device.

The electro-laser waveguide contains a HV circuit and dielectric barrier discharge device separate from the HV circuit used for the plasma discharge gap. Two different methods using electro-laser waveguides are a dielectric barrier discharge mirror and a cylinder tube. Dielectric barriers discharge mirror consists two HV electrodes with different layers of reflective materials on the top face for laser beam reflection. This mirror does not use any metallic surface—use only dielectric materials. Two different techniques for mirror laser reflection are Brewster angle and index reflective layers. The cylinder tube method consists two concentric electrode cylinders at both ends of dielectric cylinder. This eliminates the complexity of the reflective mirrors. Typical laser beam flows inside a cylinder tube of dielectric barrier discharge. The typical laser beam changes into ultra-intense laser beam as conductivity waveguide using Dopplertron effect and plasma radiation trap. These dielectric barrier discharges produce some radiation emissions that enable the typical laser beam trap electrons and carry with the electric field wavelength of laser beam.

Dielectric Barrier Discharge (DBD) may be any geometric shape using electrodes and insulated materials. The thickness of the electrodes produces a negligible effect on the overall operation, and thus should only be sized for proper thermal management based on the amount of current expected to pass though the electrode. The dielectric thickness likewise produces a negligible effect on the overall operation of the system.

There are also capacitive configurations that are not included in the conventional description. One of these is the counterintuitive phenomenon of self-capacitance, ΔC affect by changing permittivity material caused by superconductor plasma flow. The permittivity of vacuum (free space), which defines the permittivity of other materials, is one. The dielectric constant of glass is between five and ten, depending upon its chemical composition. Also, another counter-intuitive phenomenon is the accumulated high concentrations of atomic hydrogen in the vacuum tube during high temperature plasma operations.

This is how transition of impulse electrostatic field (rate of voltage) into compression works. It is so called Electro-plasmadynamic (EPD) effect or Plasma Capacitor. All these switching mechanisms cause medium compression suddenly and momentarily. A combined molecular dynamics and Monte Carlo (statistic model to determine the degree amount of ionization and numbers of electrons density) for approach was used to bridge time scales, also enabling calculations of surface recombination rates for hydrogen or gas on silicon material properties such as wall boundaries. The attractive particle interaction means that volume is increasing. The pressure is a measure of kinetic energy per unit volume. This kinetic energy density causes the particles to push against the walls all the time, so that is how the pressure may do work. However, the repulsive particle interaction means that pressure is increasing. For an example, the first effect, which has no effect on pressure, is that pump in a lot of internal energy such laser matter interaction or HV discharge gap (using two electrodes) effect on atom or molecules to do this such as a total charge Q=N e− into the system, which changed the voltage of the chamber box or tube to voltage. There may have been something like capacitor energy, $U=VQ/2=V(N\ e-)/2$, energy dumped into the chamber box or tube. This off-hand mechanism throws some charge on it which corresponds to tear apart the potential energy holding this atom or molecules together. That's reason that the Coulomb forces are weaker. The stubborn charges in this position shift back to different desired location as pressure wave as energy per unit volume.

This is analogy to plasma capacitor mechanism is based on plasmadynamic flows toward tube chamber affect the electrostatic field environment. In another word, the capacitor energy density is in motion act as pressure and even compression. Hence, plasma discharge gap may be also applied as compressor and also used for different applications. The plasmadynamic and capacitor energy flows is converting into impulse pressure and higher voltage output results. Impulse pressure and compression in storage depends on the plasmadynamic energy, the strength and stability of vorticity valves and shock waves. The capacitor energy is given by:

$$U = \frac{VQ}{2} = V(Ne^-) \rightarrow U(t) = \frac{V(t)(Ne^-)}{2} = E(t)$$

where V(t) is the rate of voltage which translate into capacitor compression as kickback charge pressure and energy by controlling the timescale of electron dynamics. The switching circuit produces impulse plasmadynamic flows that affect silicon property (atoms) of the channel tube. This energy is then adding to equation of a status of polytrophic gas.

This significant conclusion tells that these plasmadynamic flows mechanism may be applied and done based on controlling the timescale of electron dynamics in plasma channel tube of the plasma capacitor. Hence, the pressure result is not only interacting to the gas pressure modeling alone. This also does affect the amount of the electron charge into pressure of the plasma capacitor.

Hence, plasma discharge gap may be also applied as compressor and also used for different applications. The plasmadynamic and capacitor energy flows is converting into impulse pressure and higher voltage output results. Impulse pressure and compression in storage depends on the plasmadynamic energy, the strength and stability of vorticity valves and shock waves.

The simple conclusion equation of a status of polytrophic gas using total energy as function in time is $$p(E(t))=(\gamma-1)(E(t)-\rho/2(u^2+v^2))$$

where E is the total energy relates to time responses, $\gamma$ is the specific heat ratio, u and v are the particle mobility velocity, $\rho$ is the density, and V is the unit volume under boundary and shock conditions. This equation relates to repulsive particle interactions increase pressure, attractive particle interactions reduce it. The total energy is an important parameter for impulse pressure equation for circulating and even accumulating gas compression in storage. E(t) is the key of the total energy results at function time from either laser driven plasma shock wave or even any discharge plasma gap (uses electrodes via electro-laser waveguide). The attractive particle interaction means that volume is increasing. The pressure is a measure of kinetic energy per unit volume. This kinetic energy density causes the particles to push against the walls all the time, so that is how the pressure may able to do work. However, the repulsive particle interaction means that pressure is increasing. Also, this impulse pressure does affect the state of equation of the plasma channel tube.

The plasmadynamic flows toward the plasma channel tub is controlled by the timescale of electro-laser circuits. This affects and changes all the state of equations, semiconductor, and superconductor mechanism and forces all electron charge of capacitor into compression state as capacitive kickback current output.

All of this state of equations, semiconductor, and superconductor mechanisms are unification in trap into compression effects given by one total energy modeling. See model timescale equations below for an example. These pumping affect the amount of the electron charge of the plasma capacitor into compression modeling. The capacitor kickback effects describes following timescale:

Capacitor: self-capacitance, $\Delta C$, electric flux caused by voltage (plasmadynamic flow follows timescale using electronic pulse cycle) is given as $\Delta Q=(Ne^-)$.

$$Q=CV \rightarrow (Ne^-)=\Delta C(V) \rightarrow CV$$

derivative, dQ/dt is current, $C_p$ is the plasma capacitor device.

$$I=C_p dV/dt \rightarrow C_p d(Ne^-/\Delta C)/dt \rightarrow \Delta C_p d(Ne^-/\Delta C)/dt \rightarrow \Delta C_p dV/dt \rightarrow C_p dV/dt$$

Inductor: self-induced magnetic flux caused by currents is $\Phi$.

$$\Phi=LI$$

derivative, $d\Phi/dt$ is induced emf $$V=L\ dI/dt$$

This compression effect (pumping effect) doesn't affect Inductor (still use in conventional way) except Capacitor (is not in conventional way).

Hence, in a Capacitor change voltage and its capacitance, produces a powerful kickback current flow where Inductor changes the current, produces a powerful kickback voltage. These are kickback effects. If adding capacitor and inductor together in circuit, then this circuit produces a powerful oscillator load.

Suppose if the plasma channel is connected to concentric cylinders comes with several fixed dielectric gaps layers, EPD capacitor has all these fixed capacitance of value C except the plasma channel tube. This type of capillary discharge may be operated in either initially-evacuated capillaries or gas-filled capillaries as dielectric value. When the pulse plasma velocity travel inside glass capillary, the channel tube become as varied capacitive following the pulse plasma velocity. When a plasma bullet flows toward the channel or capillary, the concentric capacitor is charged to some voltage $V_s$ as the seed voltage feed by power supply, and then suddenly reduces the capacitance by drastically increasing the conductivity of pulse plasma flows along the length of concentric capacitors fit with glass capillary inside. The energy of the capacitor, $U_c$, must remain constant and if the capacitance inside the plasma channel tube is reduced by increasing electrical conductivity during gas plasma velocity along z-axis (fast pulse time), the capacitor voltage, V, would rise to a high value. Assuming a capacitor of 0.002 uF, as given above, the 'seed' voltage, $V_s$, charged from power source to say, 200V, the capacitor has a stored energy of 0.04 mJ. When a plasma bullet (hot electron clouds) flow with some electrical conductivity, σ, at greater velocity toward gas filled glass capillary tube, the capillary or plasma channel tube suddenly reduce C to 1% of its initial value, or 20 pF, where the capacitor energy, $U_c$, remains constant with little lost to heat, the plasma capacitor voltage, $V_c$, would increase to 2000 volts or more. Hence, this instantaneous power of plasma capacitor may able to generate huge electricity using either resistance or reactance load such as one turn coil inductor.

This shock-pulse plasma capacitor phenomenon involves an impulse quantum mechanism disorder against space time of a plasma waveguide channel under boundary conditions using an ultrashort pulse laser driven mechanism. This is similar to optical polarization switch (flip in order or disorder) mechanism as the propagation in a dielectric medium. This simple EPD capacitor or Plasma Capacitor mechanism may generate power electricity at much lower cost and size. It is simple and much more convenience than using bulky magnet or electromagnet coils which are commonly used for any type of Magnetohydrodynamic (MHD) generator. The plasma energy propagates has the characteristics of "negative differential resistance". The reason for that is the source of charge carriers in electrical plasma which has cloud ionization of shock-compressed plasmoid result from gas atoms. There is more current while has more ionization resulting from more charge carriers, but it doesn't take as much potential difference to keep a current going as the number of charge carriers is increased.

Silicon is an intrinsic semiconductor. Al and O is the element semiconductor. Glass may contain the Si element. Either glass or ceramic capillary tube also has its own semiconductor material characteristics that may be usefully applied to plasma capacitor generator. The characteristics of the crystals and molecules inside glass or ceramic material act as semiconductors only if applied within strong pulse magnetic and electric fields and/or absorbs shock high temperature from a pulsed plasma. The high electric conductivity and the short (~$5 \times 10^{-6}$ sec) lifetime of the shock-compressed plasmoid results in a plasma skin-layer thickness of several millimeters.

The capillary is placed inside the plasma capacitor where acts as an insulator and has its own fixed dielectric constant value. The capillary tube is made of glass, crystal, or ceramic materials that are able to allow a pulsed plasma traveling through the capillary to activate its conductivity state, and spread it to the outside surface material. The surface inside and outside of the capillary acts as semiconductor as the resistive properties create uniform electric fields. Capillary tube has two different possible quantum mechanisms of disorder, resulting from absorbing high temperature and strong electric field influence. The first disorder is to alter the capillary's atom lattice during a pulse of high temperature plasma and switching electric field state that affects its polarization state into order effect by glass or ceramic capillary tube's semiconductor mechanism. The second disorder is to absorb high temperature during a pulsed plasma inside the surface of the capillary and affect its location of the valance and conductance band of the atom lattice. This is also a semiconductor mechanism for a moment of time. High temperature plasma changes the quantum mechanics of the glass or ceramic semiconductor material into a conductivity state for the moment of time and then switches back to an insulator state. Higher temperature begins to break down glass or Alumina's strength insulator state. This phenomenon is plasma capillary semiconductor. Doping of wide bandgap semiconductors (GaAs, GaN, etc.) may be also applied inside and external of the glass capillary.

The electrical conductivity of polycrystalline and single crystal of Alumina ($Al_2O_3$) will be also activation between 1000 and 1650° C. by shock-compressed plasmoid result. Plasma has more than 5000 K (4726° C.). The conductivity between the outside and inside surface of a thin-walled hollow tube eliminates the adverse effects of dielectric medium of gas and plasma capacitor's capacitance.

The purpose of applying high voltage is to create stronger electric field and build up charge between insulator and conductor materials (semiconductor) to near threshold activation state before quantum mechanism disorder occurs. Altering disorder and high electric field on the plasma capacitor changes its glass polarization, dielectric medium, and semiconductor state.

Any gas element or seed gas mix with element gas may be chosen and used to meet any suitable optimization parameters.

Some elements like Argon produce ionized gas with high electrical conductivity at a low degree of ionization. Hot gas plasma may be measured and determined for conductivity. Seed gas may be added in the plasma capillary which may be used with an external device, while maintaining the purity of gas flows within a closed loop. Elements in the gas may boast electrical conductivity during pulse plasma operation.

All dielectrics have a certain value of breakdown potential. Air, ceramics, glass, etc. (including semiconductors like Silicon), this potential provides sufficient energy to ionize a few atoms. The free electrons formed as a result of this ionization are energized enough to bump the neighborhood atoms, break some covalent bonds and produce more free electrons. These free electrons are then accelerated by the applied electric field. They collide and ionize the other atoms to produce more free electrons (multiplication by collision). This large number of free electrons is available for current flow. Plasma is conductive and heavily responds to electromagnetism. The degree of gas ionization may be very different and is not always 100 percent. Low pressure gases conduct currents at low voltage and are mostly gases than plasmas.

There are two methods for doping capillary processes: 1) Chemical Vapor Deposition (CVD); and 2) Plasma Outside deposition (POD). Several glass manufacturers are able to do Chemical vapor deposition (CVD) or plasma outside deposition (POD) inside and outside of glass pipe or capillary. For the production of doping capillary or pipe, deposition of fused silica with defined semiconductor bands is done inside of fused silica tubes. The chemicals are brought into the tube by a carrier gas. The reaction to form soot is triggered by a heat source. Many heat sources may be used for the Chemical Vapor Deposition (CVD) process. Heat sources include: a flame (MCVD), a furnace (FCVD) and, plasma (PCVD). All gases that have not reacted are treated in a scrubber.

A plasma heat source is used to "burn" chemical precursors and deposit a thin glass layer on a rotating target (inside doped deposition) using outside plasma deposition process. The target may be a round tube or pipe. This process is best suited to produce doped compound with fused silica, because of the high temperature of the plasma. The maximum content of doping compound in silica may be achievable as a function of deposition temperature.

There is a limit to the maximum doping content, because doping compound also etches away fused silica. The higher the doping content in the gases, the slower the deposition is.

The plasma outside deposition is typically employed to produce highly compound doped silica. Heraeus, Corning, Schott, and other glass manufacturers offer it as a service as well.

These tubes may be also fused and bonding with other un-doping tubes to match plasma capacitor length.

All glass materials are silicon based semiconductors. Synthetic diamond material is also based on semiconductor. Other compound semiconductors include: silicon germanium, silicon carbide, and III-V compounds, such as gallium arsenide. III-VI compound semiconductors are also included AlN, GaN, InN, AlP, AlSb, GaP, GaAs, GaSb, InP, InAs, InSb, AlxGa1-xAs, and InxGa1-xAs. Columns II and VI of the periodic table are also form compound semiconductors.

The main reason for the inclusion of the IIA and VA groups is the glass materials as silicon based semiconductors that are to show the dopants (impurities in glass materials) used with the group IVA semiconductors. Group IIA elements are acceptors, P-type dopants, which accept electrons leaving a hole in the crystal lattice, a positive carrier. Boron is the P-type dopant for diamond and even used for Borosilicate glass (absorb radiation energy such as nuclear reactions or cosmos ray) and is the most common dopant for silicon semiconductor. Indium is the P-type dopant for germanium. Group VA elements are donors, N-type dopants, yield a free electron. Nitrogen and Phosphorus are suitable N-type dopants for diamond. Phosphorus and arsenic are the most used N-type dopants for silicon. Antimony may also be used.

All these doped elements may be used for glass capillary or pipe for plasma capacitor applications. Glass is an intrinsic semiconductor material that is a poor conductor. N-type semiconductor is doped with an impurity that has an abundance of free holes. These are positive charge carriers. The P-type material is conductive where the hole is the majority carrier. Most semiconductors are based on elements from group IVA of the periodic table. Silicon is the most dominant and widely used for this application. Germanium, Diamond (Carbon), and compound semiconductors such as silicon carbides (group IVA) and gallium arsenide (group III-V) may also be used. An intrinsic semiconductor material may be also used for the plasma channel tube would not require any doping.

Two possible optic sensor methods may be used to detect the current density of the plasma flow, Fiber Optic Coil and Bar Sensor.

Faraday fiber-optic coil sensor acts as an insulator and is based on the magneto-optic or Faraday effect in silica fiber. This effect is based on a polarization rotation of light transmitted throughout a magneto-optical medium if a magnetic field is applied longitudinally along the direction of light propagation. All silica-based optical fibers possess this effect. The important advantage of the Faraday sensor is that the Faraday effect is proportional to a magnitude of applied magnetic field, therefore the total rotation of the polarization angle of light is proportional only to magnetic field (B) travel following electric current (I) or current density flows (J).

The properties of these high-birefringence, spun fibers make them ideal for high-sensitivity Fiber Optic Current Sensors (FOCS) [also known as Optical Current Transformers (OCT)]. In these applications, they may be used for both AC and DC current sensing. FOCS and OCT rely upon measuring the rotation of the polarization of light caused by the Faraday effect. The Faraday effect causes a rotation in the polarization state through an applied magnetic field. For current sensing applications, the magnetic field is generated by a current carrying conductor. Since the magnetic field produced by the conductor is linearly proportional to the current, the polarization rotation is also proportional to the current. Sensitivity may be further increased by coiling the fiber around the glass tube channel or capillary.

For the coil, the rotation, $\beta$, is proportional to V×N×I, where V, N, and I are as defined below. This optic fiber coil will also deal with vibration and shock force using mechanical structure design such as wrapping around thread glass bolt with a sealed round nut.

Faraday fiber-optic coil sensor combined with a photo-conduction semiconductor switching circuit (delay and timing trigger) offer extremely fast response times with high measurement accuracy. The size and weight of the fiber optic sensor is reduced in comparison with existing technologies and they do not explode during catastrophic failure during extreme impulse energy conditions. This specialty sensor equipment product may be purchased off-the-shelf (COTS).

This sensor is used to assess the intensity of the plasma or current flow passing in a plasma capacitor or conductor by measuring the density of the magnetic flux created around the plasma flow or conductor by the charges' displacements. The density of the magnetic flux is given by the rotation of the polarization state of the light wave travelling in the fiber or in the magneto-optical material. This rotation is due to the magneto-optical effect which is proportional to the length of interaction (L) and to the Verdet constant (V, radsT$^{-1}$T m$^{-1}$) of the material used for making the sensor. The angular rotation, $\theta$, (in degrees) of the polarization of the wave travelling in the component is given by:

$$\theta \propto V \times N \times J$$

where V is Verdet constant (radT$^{-1}$m$^{-1}$), N is the number of turn, and J is the plasma density flows.

B is the magnetic induction (Tesla) which is a function of the plasma current density, J, travelling in the semiconductor tube waveguide or channel and of its geometry. This simple method is used to make the depolarized light pass through the polarizer. Then this polarized wave is modified by the influence of the magnetic field pulse and eventually this rotation is converted into a modification of intensity registered by the photodetector circuit. Different methods may be also used to detect and trigger from the current density of the plasma flow. This specialty fiber coils within glass tube or waveguides (planar) may be also applied for laser driven shock wave gas compressor.

The optic bar may be also used for this application. The advantaged of using optic bars is simple placement in sensor position at lower cost operation. he magnetic field B produced by the current of a metallic wire is:

$$B = \frac{\mu_0 j}{2\pi R}$$

where R is the distance from plasma channel, j is the current density, $\mu_0$ is the permeability of free space. And if the length of glass rod d is small enough, the magnetic field may be constant inside the glass material and is given by:

$$\varphi \approx VMd = \frac{\mu_0 V j d}{2\pi R}$$

where V is Verdet constant, d is the distance of glass rod sensor, R is the distance from plasma channel glass, and j is the current density.

FIG. 1 shows the compressor (100), which is connected in series with a low pressure hydrogen source and higher pressure load in an open or closed system. The compressor is cylindrical. The hydrogen source is in fluid communication with the compressor though an inlet (1) in the aft end. The inlet may be in line with the center axis of the compressor or at an angle to the axis, depending on the system in which the compressor is installed. A flow path for gas is present for the entirety of the compressor interior, from the check valve chamber (2), past a nozzle and diffuser assembly (3), through a restrictive flow valve chamber (4), into a storage chamber (5), to an exhaust valve (6); pressure will be equalized throughout, priming the compressor for operation. Any gas left over inside the device should be evacuated, flushed out or degassed before charging new gas. The check valve (2) is located at the upstream end of the compressor housing the stack conical structure (16). Downstream of the check valve chamber (2) is the restricted flow chamber (4) housing a cone insert (25). Downstream of the restricted flow chamber (4) is the storage chamber (5), with a shell (33), a spiral core (28), and spiral grooves (39). Downstream of the storage chamber (5) is the exhaust (6), housing an exhaust guide (29), and connected to an adapter (7).

Figure 2:
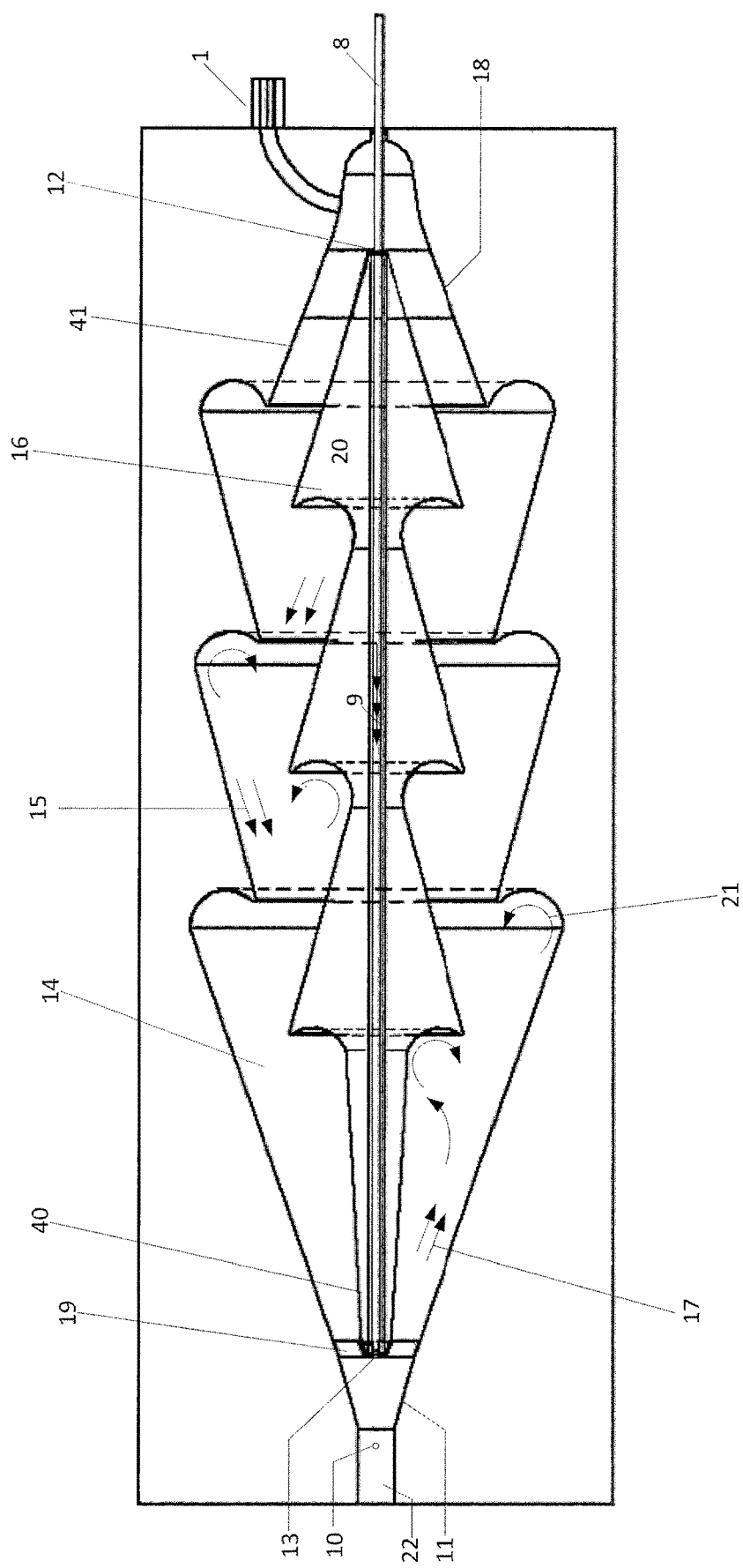
FIG. 2. Depicts an embodiment of the check valve chamber.

FIG. 2 Depicts an embodiment of the check valve chamber, in which the hydrogen inlet (1) is at an angle to the compressor axis and a femtosecond laser (8) is in line with the compressor center axis. A laser pulse (9) from the femtosecond laser (8) has an intended focal point (10) within a nozzle (11) portion of the check valve. A tube runs the center of the structure providing a path for the laser. The laser beam bore tube (20) may be a long hollow cylinder or rectangle that allows any fiber or optical lens components to be installed inside. These optical components may be fiber optic lines, mirrors, lenses, or a mixture of the three.

The lenses (12) may be designed to allow transmission of specific wavelengths. The lenses may also be a Bragg Grating used to expand the beam and lower its intensity to prevent damage the focusing lenses (13). The laser may be a single beam or an array of beams. A focusing lens (13) installed in the laser bore tube (20) focuses the single beam or the array of on to the single focal point (10).

The check valve cavity (14) is designed as a series of cavities that start with a large cross section and then taper to a small cross section in the direction of the flow of low pressure hydrogen (15). The widest cross section of each of these cavities has a circular lip, which connects the cavity to the narrow cross section of the following cavity. Housed within each cavity, is a structure of a small cross section which expands to a large cross section within the adjoining cavity. The base of the structure is a concave circular lip that connect to the small cross section of the following structure. This stacked conical structure (16) combined with check valve cavity produces a low resistance to flow in the direction of the low pressure hydrogen flow and a large resistance to back flow (17). A tapered cylindrical extension (40) extends from the base of the stacked conical structure (16) to the nozzle upstream of the focal point. The stacked conical structure (16) is held in place by forward (18) and aft (19) finned support structures. The forward support structure (18) is in physical contact with the first cone in of the stacked conical structure (16) and is in physical contact with the first of the series of inner conical surfaces (41) of the check valve cavity. The aft finned support structure (19) is in physical contact with the end of the tapered cylindrical extension (40) and is in physical contact with the last of the series of inner conical surfaces (41) of the check valve cavity.

Vortices (21) produced by the design of the check valve resist backflow (17) leaving only the nozzle (11) as an outlet for increased pressure created by a laser induce plasma shockwave. A small capillary (22) extends from the nozzle to a diffuser in the restricted flow chamber (4).

Figure 3C:
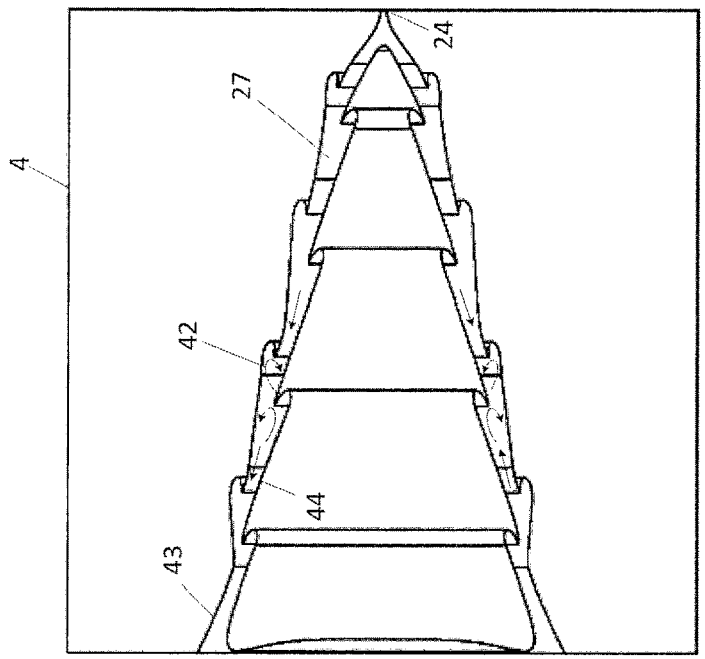
FIG. 3C. Depicts the assembled restricted flow chamber and the resulting flow path.
Figure 3B:
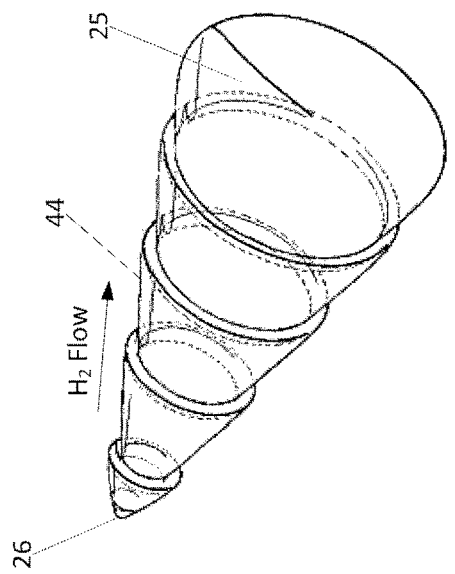
FIG. 3B. Depicts the restricted flow chamber insert.
Figure 3A:
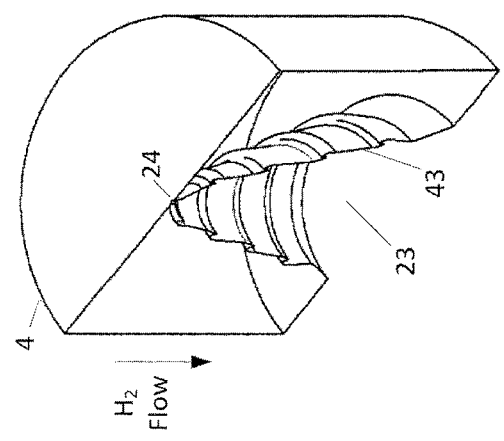
FIG. 3A. Depicts an axial Cross section of the restricted flow chamber shell.

FIGS. 3A, 3B, and 3C depicts the components and the flow path of the restricted flow chamber.

FIG. 3A is a cross section of the restricted flow chamber (4). The restricted flow chamber may be a cavity (23) from a small cross section connected to the diffuser (24) to a large cross section connector to the storage chamber. The cavity is made up of a series of substantially cylindrical cavities of increasing size stacked end to end. At the leading edge of each cylindrical cavity is a "S" shaped ring that connects the leading edge of one cavity to the trailing edge of the cavity prior to it.

FIG. 3B is a cone insert (25), with a tip (26) of which may reflect the shock front waves and also absorb laser beam target leftover acting as a laser beam dump. The tip (26) may be designed with a magnetic field assembly and fused with glass-ceramic material, for resistance to plasma flow. The cone insert (25) is made up of a plurality of cones of increasing diameter stacked base to tip. The base of each cone is a concave lip connecting the base to the tip of the following cone. The cone insert (25) is primarily made of glass or ceramic materials.

FIG. 3C show the placement of the cone insert (25) within the cavity (23). A complex flow path (27) is created by the inner stepped conical surface (43) of the restricted flow chamber (4) and the outer stepped conical surface (44) of the cone insert (25). A powerful vortex array (42) resists any backward pressure flows from the higher pressure storage chamber.

FIG. 4A shows the spiral grooved core (28) of the storage chamber (5). The spiral grooved core (28) is fused at one end to the cone insert (25), and at the other end to a substantially conical exhaust guide (29). The spiral grooved core (28) may be a solid cylinder with plurality of grooves (39) surrounding its outer surface arranged in a substantially 90 degree arc. Though the arc of the spiral pattern is shown to be 90 degree, may arc design may be modified to meet the needs of the system. The storage chamber (5) groove pattern may be spiral or helix, and even straight grooves (39).

FIGS. 4B and 4C show the tunnel pattern within the spiral grooved core (28), which has a plurality of tunnel holes (30) or small bore orifices. The diameter of the tunnel hole (30) will be no wider than the groove in which it resides. The tunnel holes will extend straight from one grove to a second groove opposite of the first. Other grooves (39) may not have tunnels to insure the tunnels may not interact with each other. The tunnels holes (30) in the spiral grooved core (28) are in the pattern of a spiral staircase. The spiral grooved core (28) is not limited to the use of tunnel holes, it may also use small bore orifices which do not extend to the center of the core. Allowing for a greater volume while still ensuring no interaction between the tunnel holes and orifices.

Figure 5B:
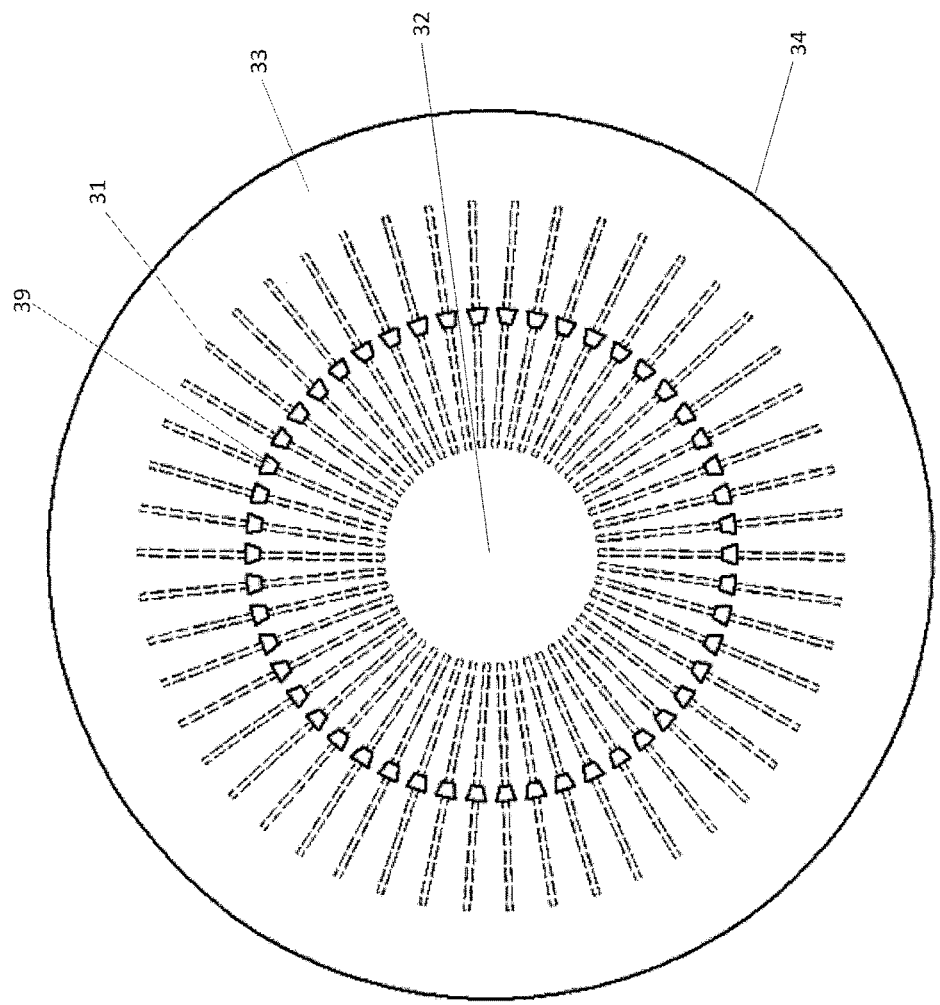
FIG. 5B. Depicts a side view of the straight groove storage module.
Figure 5A:
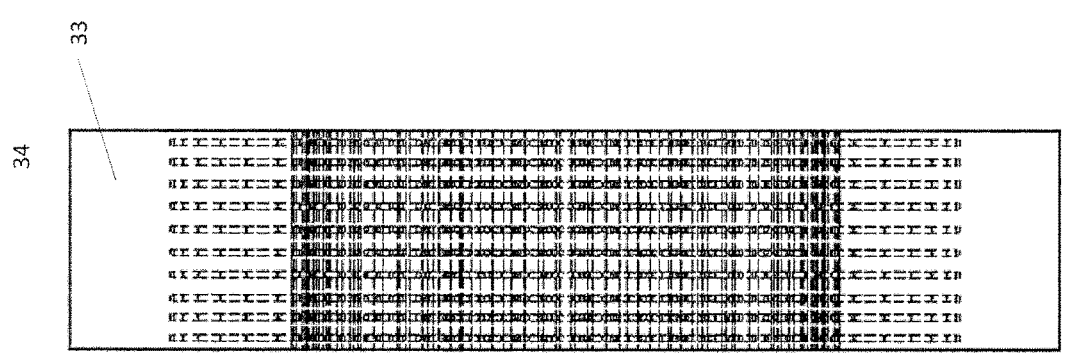
FIG. 5A. Depicts the straight groove embodiment of the storage module core and shell.

FIGS. 5A and 5B show the straight groove embodiment of the storage chamber (4). The straight groove core (32) is fused on one end to the cone insert (25) and to the conical exhaust guide (29) on the other end. The straight groove core (32) may be a solid cylinder with a plurality groove running straight from the cone insert (25) to the conical exhaust guide (29). Each of the grooves contain a plurality of small bore orifices (31) which extend into the straight groove core (32) without reaching the center. The storage chamber shell

(33) may contain a plurality of small bore orifices (31) that correspond with an opposite small bore orifice, when used with the straight grooved core (32), or contained when designed for use with the spiral grooved core (28). The small bore orifices (31) in storage chamber shell extend into the shell, nearing but not reaching the storage shell outer surface (34). The cylinder grooved core (28) and the straight grooved core (32) both act heat sinks while the storage chamber shell (33) acts as a heat exchanger.

Figure 6B:
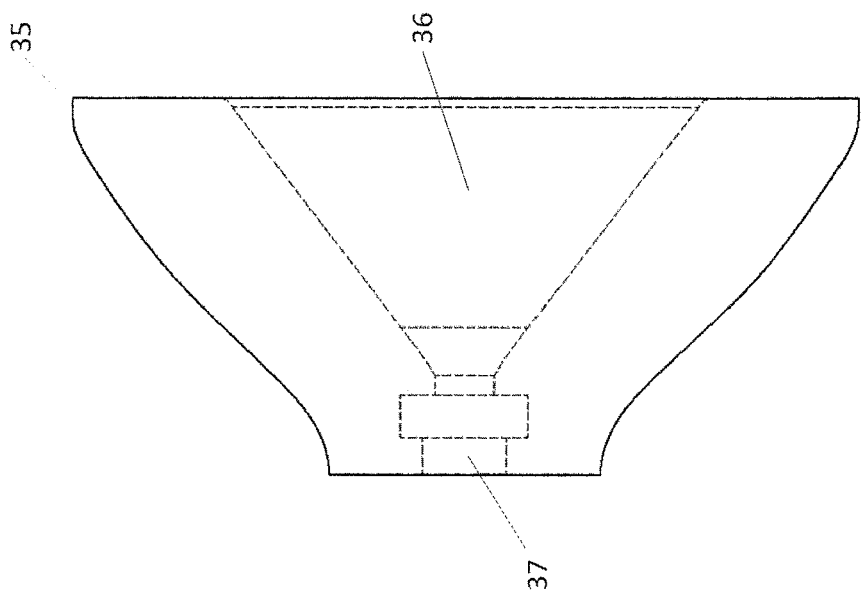
FIG. 6B. Depicts a side view of the exhaust shell.
Figure 6A:
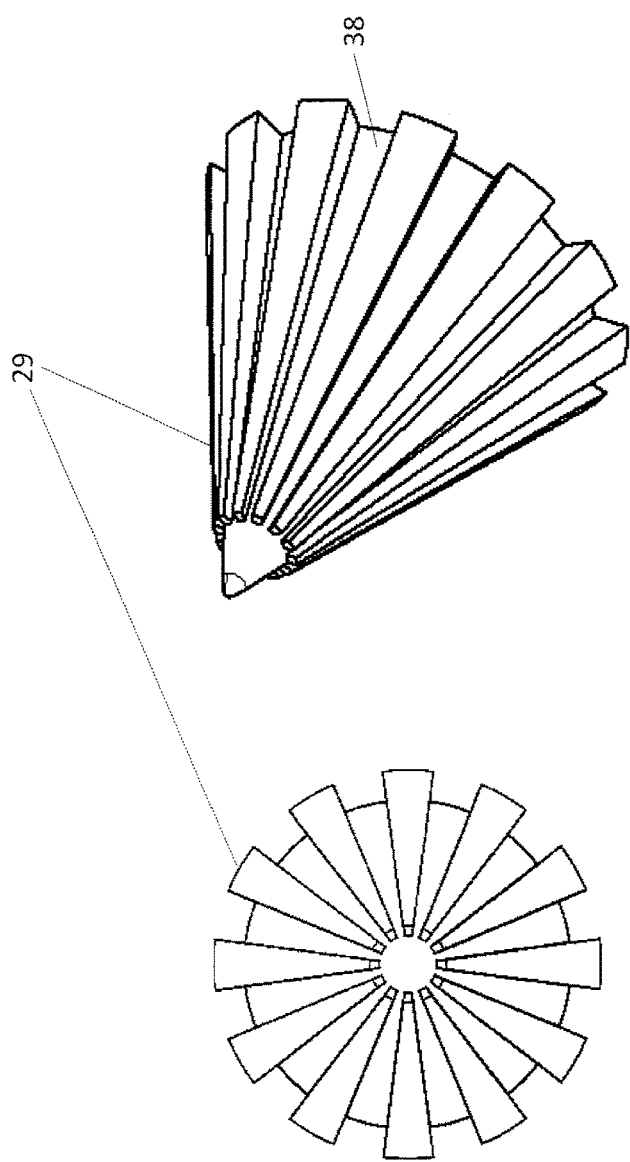
FIG. 6A. Depicts an embodiment of the exhaust cone.

FIG. 6A shows an embodiment of the conical exhaust guide (29), while FIG. 6B shows the exhaust shell (35). The exhaust (6) may be an exhaust shell (35) with a conical cavity (36), which houses the conical exhaust guide (29). Connected to the conical cavity (36), is a complex shaped cavity (37) designed to house the adapter (7), which connects the compressor (100) to the open or closed system in which the compressor is installed.

The grooved embodiment of the conical exhaust guide depicted in FIG. 6A may be used with either the straight grooved core (28) or the spiral grooved core (33). The grooves (38) may align with the grooves in the storage chamber (5) and provide improved structural integrity to the exhaust (6). The exhaust shell (35) and conical exhaust guide (29) form a smooth path through the adapter (7) to an open or closed system. Internal, pressure, density and flow rate are controlled by a regulating in the open or closed system based on the need of the system.

Figure 7:
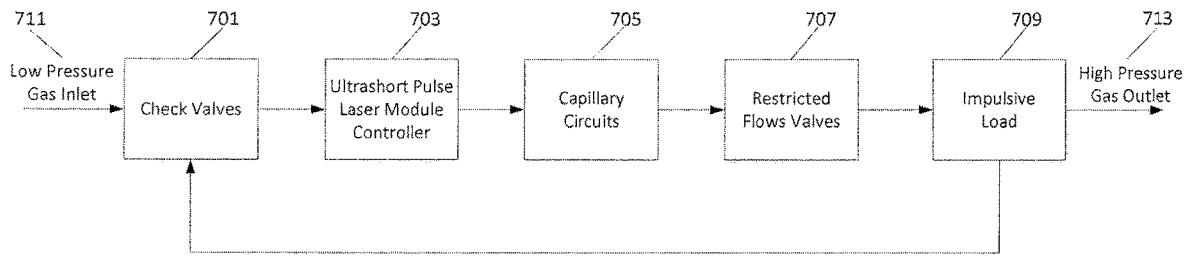
FIG. 7. Depicts a simple flow diagram for the method of shock gas compression using Laser Driven Mechanism FIG. 8. Depicts a detailed flow diagram of the method of shock gas compression using a Laser Driven Mechanism FIG. 9. Depicts a cross-section of an embodiment of the capacitor system.
Figure 8:
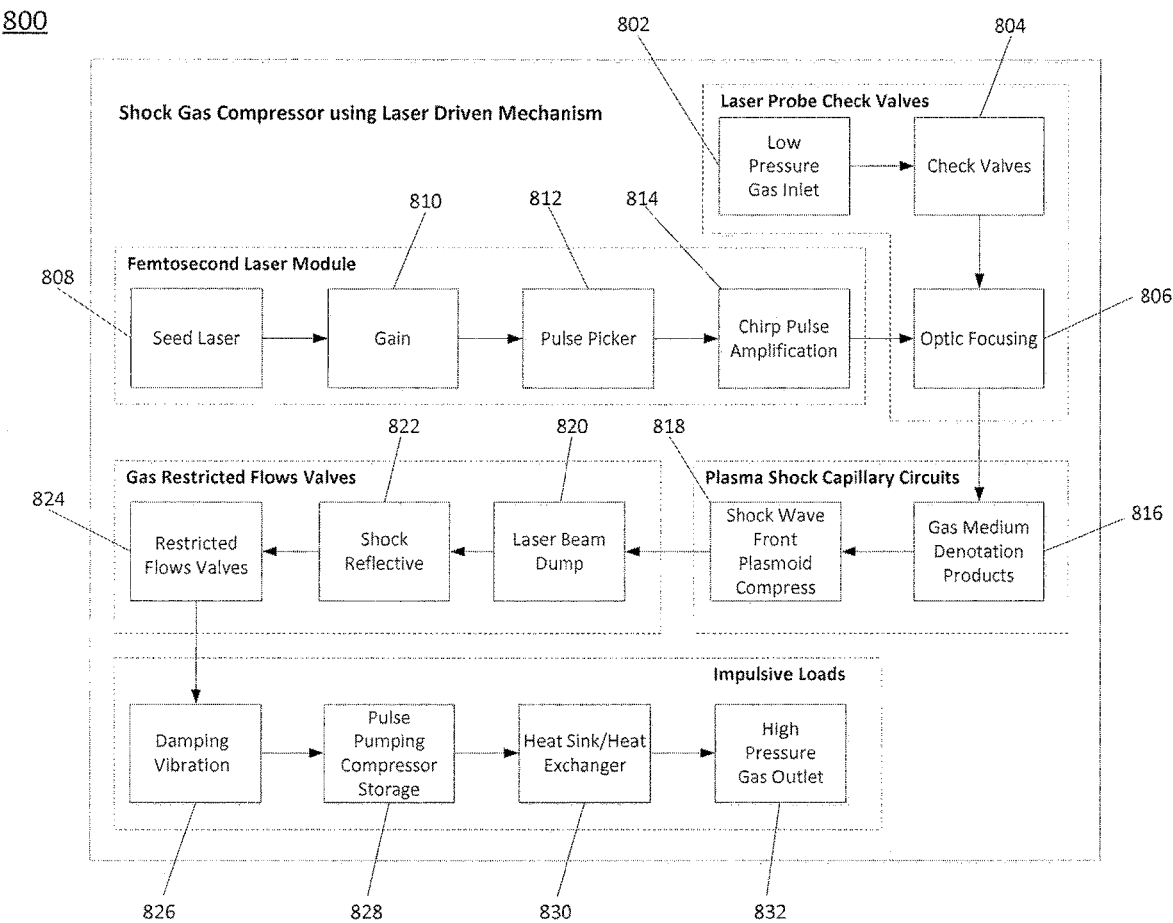
Figure 9:
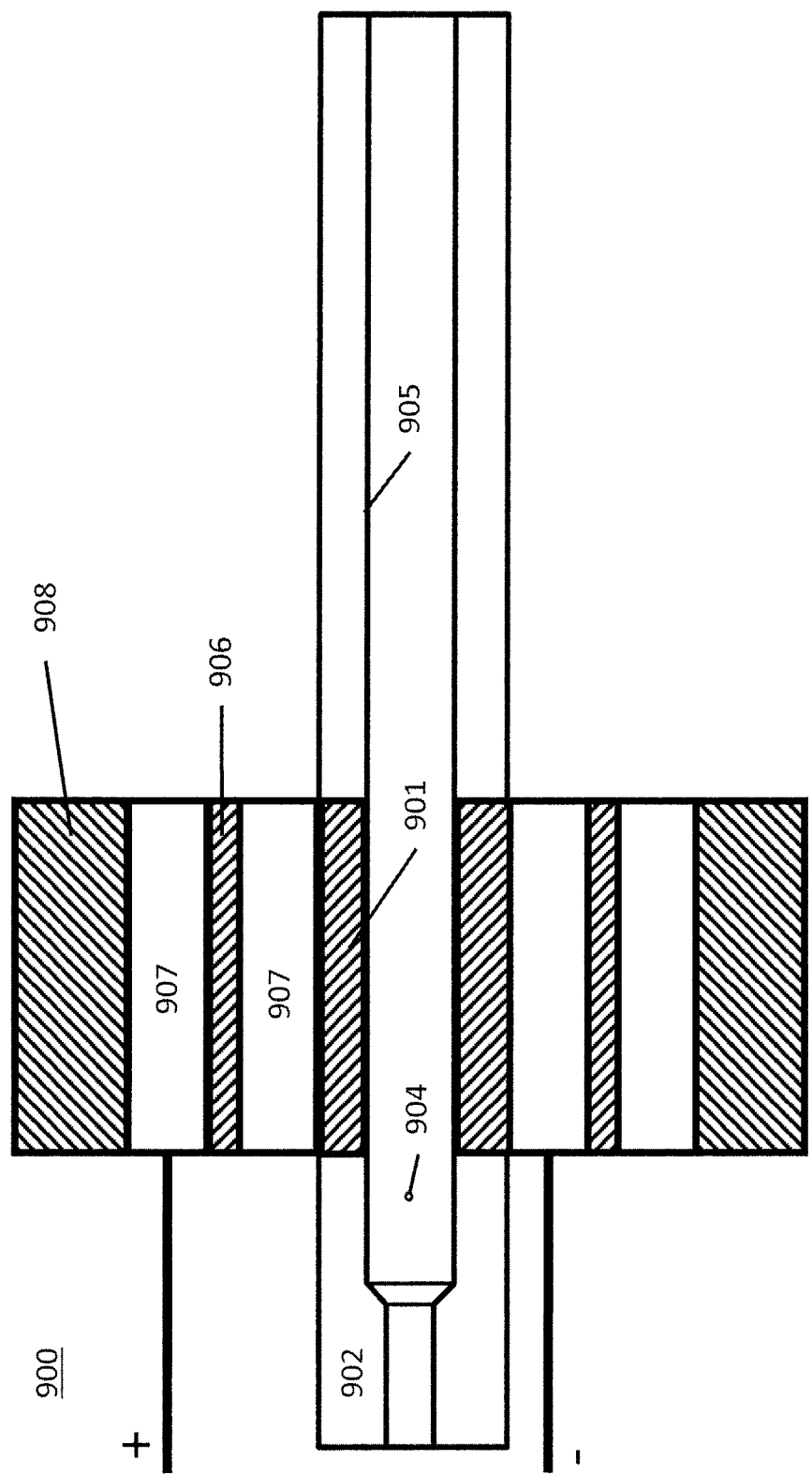

FIG. 7 shows the basic method (700) of the compressor in a closed circuit, such as a hydrogen based refrigeration unit. The path being the low pressure gas inlet (711), when charging the system. Followed by the check valves (701), then the Ultrashort Pulse Laser Module Controller (703), which sends the laser pulse, capillary circuits (705) direct the plasma and gas to the restricted flow valve (707). The restrictive flow valve (707) prepares the hydrogen for the impulsive load (709). The impulsive load being the storage unit and any other loads or heat exchangers that use the hydrogen before it is returned to the check valves. Lastly the High Pressure Gas Outlet (713) is used to remove hydrogen from the system FIG. 8 show a detailed method (800) of the shock compression using a Laser driven mechanism. The Low Pressure Gas Inlet (802) allows the flow of gas into the check valves (804), which resist back flow and direct hydrogen to the optical focusing (806) point. A femtosecond mode-locked laser gain (810) (boost energy of laser irradiance), which may contain saturable absorber optics, tuning mirror, doping fiber, may be used and work with a seed femtosecond laser module (808) (lower energy), which may contain a high power current supply, a solid state laser diode, and a laser oscillator crystal. The purpose of the pulse picker (812) is to create desired pulse trains using femtosecond duration at pulse frequency generator rate. The pulse picker is controlled by a high voltage power supply, a pulse frequency generator, and a pulse picker crystal (e.g. band pass or notch filter). The pulse picker is used to selectively pick off pulses from the pulse train of a femtosecond laser. The purpose of the chirp pulse amplification (812), consisting of a pulse stretcher, doping amplifier fiber, and pulse compression optics, is to meet threshold damage of fiber or optical components for long lifetime and safety operation. The laser pulse through optical focusing (806) to a single point. It interacts with the hydrogen producing gas medium detonation products (816) in the form of plasma and a shockwave front. The shock wave front (818) forces the plasma and hydrogen. The stepped cone in the restricted flow valves (824) absorbs excess laser acting as a laser beam dump (820) and reflects some of the shockwave (822) directing the rest to the restricted flow valves (824). Vibration damping (826) occurs within the storage module. Each laser pulse pumps more hydrogen into the compressor storage (828) raising pressure. The small bore orifices (31) provide a volume in which the plasma recombines and the hydrogen gas is compressed. Excess heat is removed from the hydrogen (830) via the core acting as a heat sink and the shell transferring heat out of the compressor. This may be achieved through the storage shell outer surface (34) by jacketing with a coolant or installing fins to improve heat transfer. Graphite or metal inserts may also be used in the chamber to improve heat removal from the gas. When desired pressure and temperature is achieved hydrogen is released to the system via the high pressure gas outlet (832) as system demands dictate.

Though the disclosed subject matter is described specifically with respect to compressing hydrogen, it may be used to compress any gas including air, requiring only modifications in wave length and pulse frequency and structural dimensions, with little change in fundamental design. This disclosed subject matter may also be used to pump gasses and fluids, such as water without compression, as a plasma accelerator through use of Helmholtz coils and plasma capacitor circuits. The disclosed subject matter may be used as an ultrafast switching dynamic polarization controller, using a plasma capacitor tube circuit. The principle of this disclosed subject matter may also be used to generate hydrogen through laser driven water thermolysis. The disclosed subject matter may be made with a 3 dimensional flow path described above, or made with a 2 dimensional flow path. For a 2 dimensional flow path the cones are replaced with wedges, the cylinders with rectangular plates, and the storage core will have paths normal to direction of flow leading from the outer edges of the core toward but not reaching the centerline of the core. A 2 dimensional flow path will not require the finned supports nor will is require the restricted flow chamber and exhaust wedges to be fused to the storage core. The laser pulse (9) of FIG. 2 may be an array of pulses created be the lens (12). The lens (13) may be an array of lenses directing the array of pulses to a single focal point. The forward finned support structure (18) of FIG. 2 may be configured to receive a laser pulse normal to the compressor center axis, and reflect it via mirror along the center axis.

At its core the plasma capacitor system is made up of a capillary or shock reflecting tube (900) with a portion (901) doped to act as a semiconductor. The tube has a small diameter (902) which then expands to a larger diameter tube (903) upstream of the focal point of the laser (904). The expansion is helpful as the shock wave caused by the creation of the plasma is spherical. The sloped wall at the expansion redirects a portion of the shockwave back in on itself reducing the strength of the wave traveling upstream. The inner wall (905) of the shock reflecting tube may have multiple geometries, including but not limited to spherical and hexagonal. The plasma capacitor system is not limited to a single shock reflecting tube. An array of tubes could be used.

Figure 10:
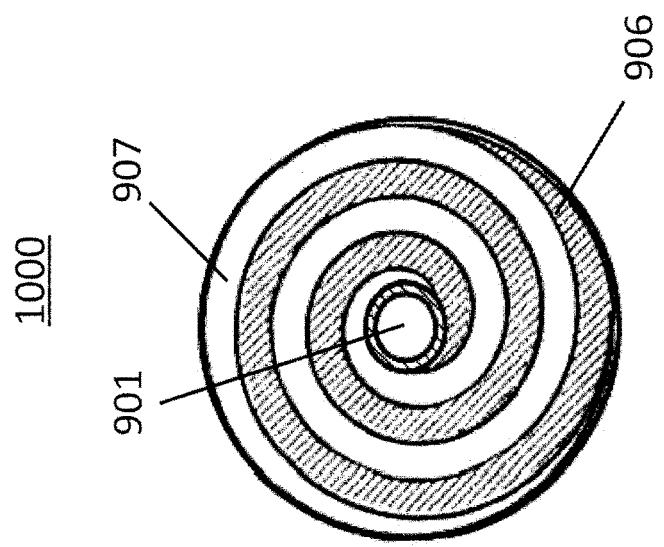
FIG. 10A. Depicts a hollow cylinder embodiment of the plasma capacitor.
FIG. 10B. Depicts a stacked disk embodiment of the plasma capacitor.
FIG. 10C. Depicts a spiral disk embodiment of the plasma capacitor.
Figure 10:
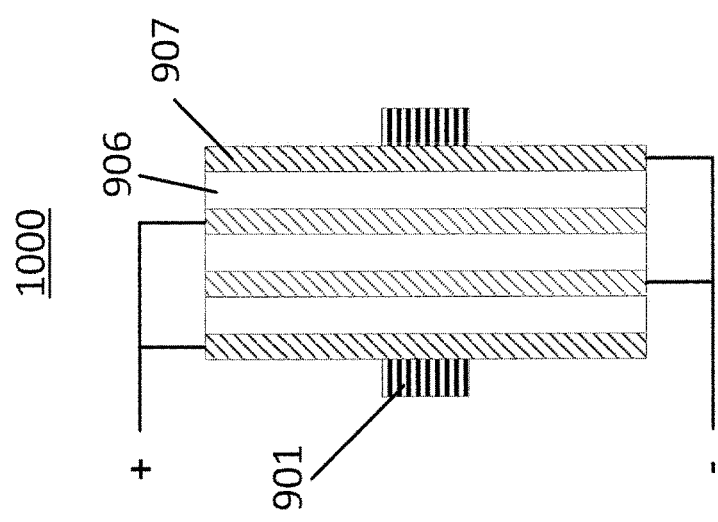
Figure 10:
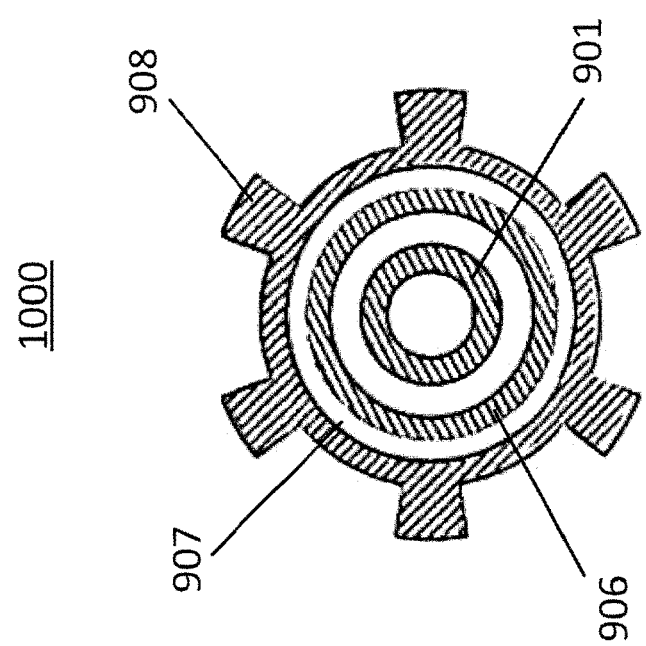

Surrounding the tube or array is the capacitor (1000), which could take multiple forms, shown in FIG. 10, either concentric hollow cylinders with a dielectric layer (906) adjacent to a conductor (907), a series of disks (1001) along the tube alternating between a dielectric and a conductor, or a single dielectric layer adjacent to a single conductive layer made to spiral (1002) in on itself to form a single disk who's make up alternates between dielectric and conductor along the radius of the disk. The capacitor may also be surrounded by a structural layer (908) of dielectric material or glass configured to provide structural support to the capacitor and reflecting tube (900).

The capacitor (1000) has positive and negative leads, the polarity of each lead may alternate with each new conductive layer in order to ensure a voltage across each dielectric layer. Each positive lead will be connected through a switches to a high voltage power supply and a load.

Figure 11A:
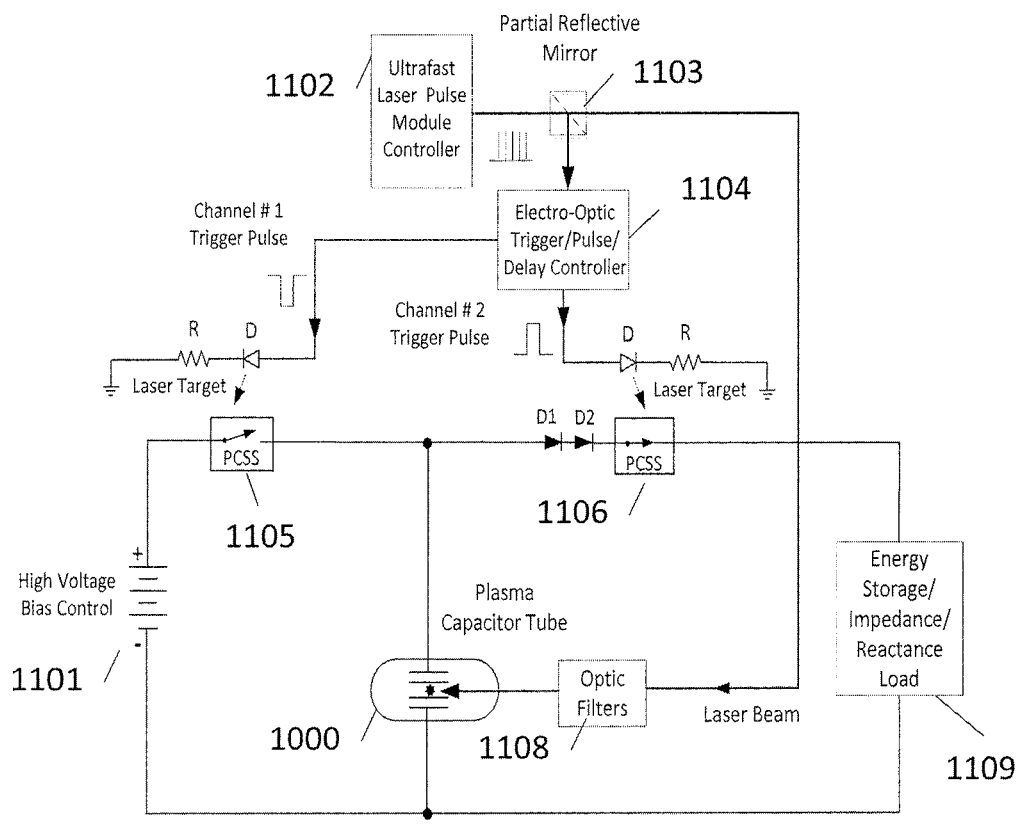
FIG. 11A. Depicts a basic circuit for the use of the plasma capacitor.
Figure 11B:
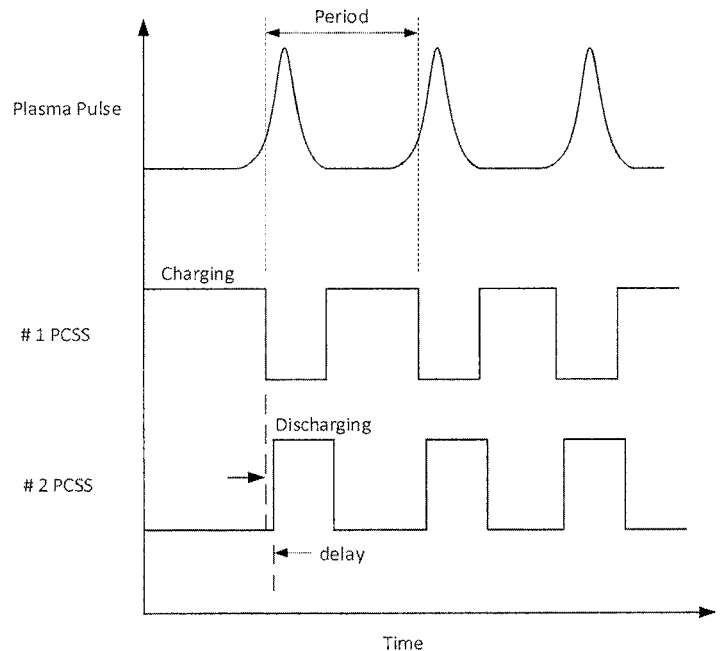
FIG. 11B. Depicts the switch timing for the basic plasma capacitor circuit.

As shown in FIG. 11A the HV power supply (1101) charges the plasma capacitor (1102) at pulse rate by trigger switching device and control by the laser pulse trigger. The partial mirror provides a portion of laser beam for trigger switch devices. The trigger switch circuit may be used either with photoconductive switches or trigger spark gap devices. The electro optic box (1104) which could be COTS has its own trigger and delay circuit using hybrid optical and electronic components. The laser pulse travels through the partial mirror (1102) and triggers the electro-optic box (1104). The electro-optic box sends two separate pulses of the laser beam toward the #1 photoconductive switch (PCSS) (1105) and #2 PCSS (1106). The channel one switch kept open while Channel #2 switch keeps close at the same time. FIG. 11B of switching pulses timing. Channel #1 switch will be off while the plasma capacitor (1102) is discharging toward load (1109). The Plasma Capacitor discharge voltage to the load circuit and drives the current flow (A). After the capacitor completes discharging, #1 PCSS is closed, allowing the seed HV power supply (1101) to charge the plasma capacitor (1102) again while the #2 PCSS is opened. This lasts until the next laser pulse trigger. Through this a large amount of voltage and current may be stored or used.

Figure 13:
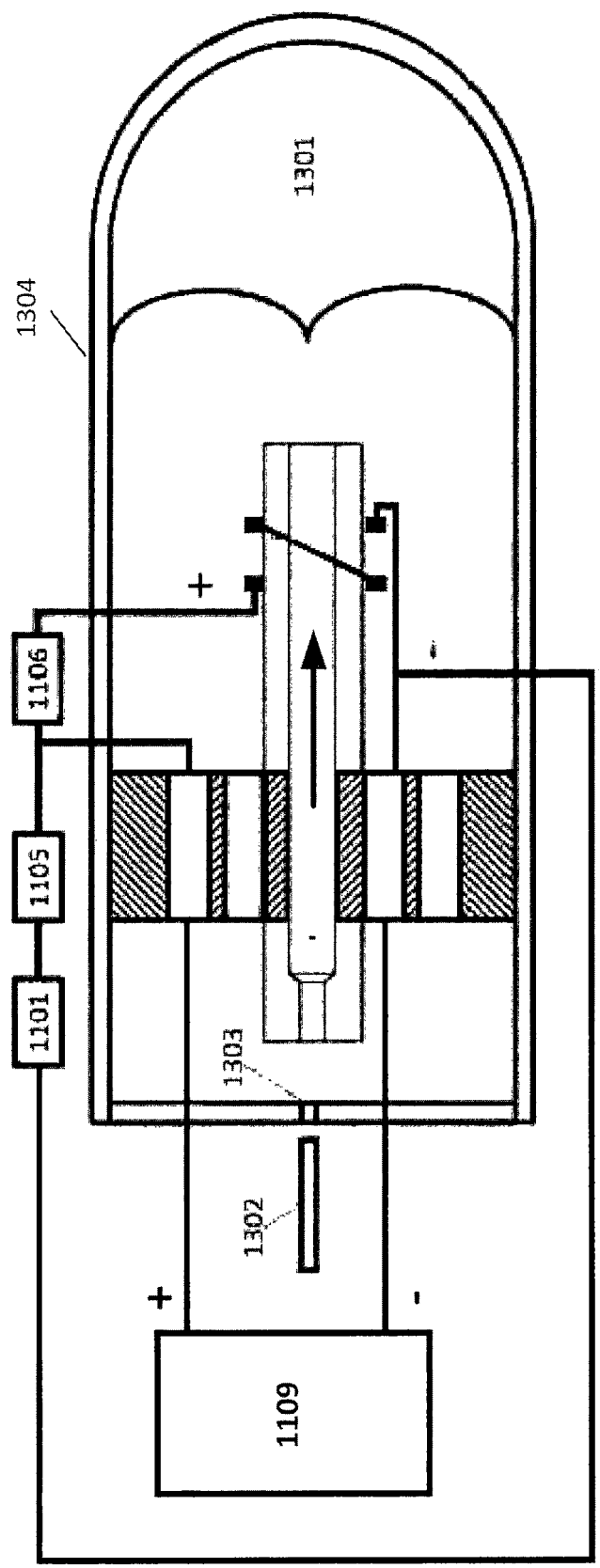
FIG. 13. Depicts an embodiment of the plasma capacitor system installed within an oscillating chamber.

FIGS. 12 and 13 show the capacitor (1000), the shock reflecting tube (902) and the load (1109) may all be housed inside a plasma shock driven device like an oscillator chamber (1304), and the afore discussed compressor (100). The oscillator chamber (1304) can be composed of the same materials as the plasma compressor. In each case the load (1109) could take the form Helmholtz coils used to compress the plasma flow and increase the effectiveness of the shockwave. Within the compressor (100), the doped shock reflecting tube (902), surrounding capacitor (1000) and Helmholtz coils (1201) replace the short capillary (22) and combine to greatly increase the compression ratio of the compressor.

Contrary to the compressor, the oscillation chamber (1300) is normally a sealed environment. It is filled primarily with hydrogen. When ignited by the laser the plasma travel through and exit the tube and impinge on a heat sink (1301) shaped to redirect the plasma around and past the capacitor (1000) to the end of the oscillating chamber and back into the shock reflecting tube (902). While traveling to the entrance of the tube the plasma will associate back into the hydrogen gas. The gas may then be reignited by subsequent laser pulse producing a charge discharge cycle for the capacitor, and powering a load at a cyclical rate equal to the frequency of laser beam pulses. Though depicted as Helmholtz coils or single turn coil, the load could be any form of energy storage, impedance, or reactance device.

To this point, the basic operation of the plasma capacitor and oscillator tube have been described. This operation may be made more effective through the use of Dielectric Barrier Discharge Mirrors (DBDM), pre-ionization nanosecond lasers, Electrical Discharge Gap, and an Electro-laser waveguide.

The capacitor system works best when unidirectional plasma flow is achieved. The compressor ensures unidirectional flow by use the check valve system upstream of the shock reflecting tube and the ultra-short laser focal point. The oscillating chamber may optionally have an installed check valve, but also could achieve this through the use of a second laser. A nanosecond laser may be used prior to the ultrashort (femtosecond) laser. Also referred to as a pre-ionization laser, this laser will provide a channel to guide the ions created by the ultrashort laser down the shock reflecting tube, ensuring their movement is unidirectional.

Figure 14:
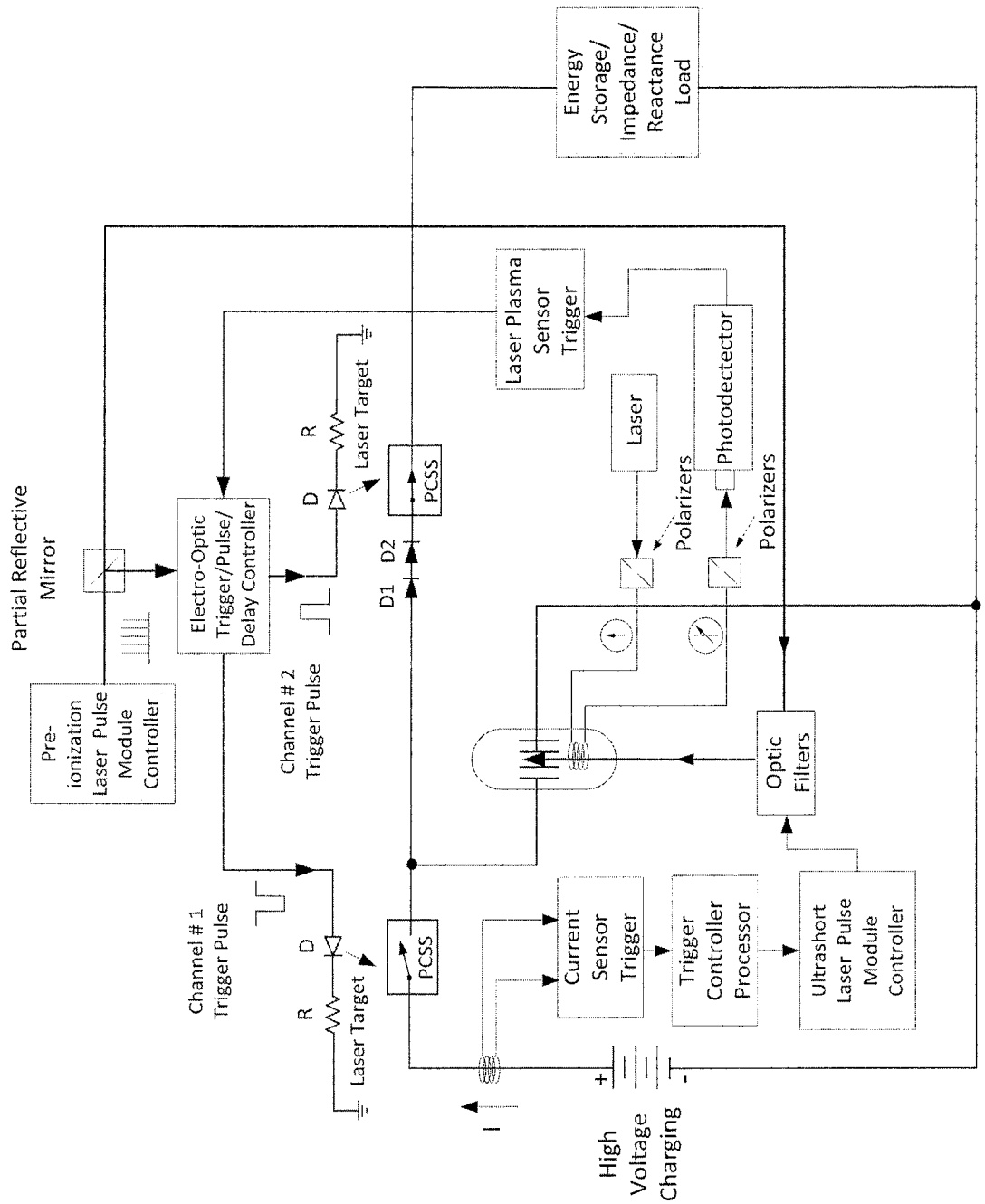
FIG. 14. Depicts a circuit for the use of the plasma capacitor system involving dual lasers.

As seen in FIG. 14, the pre-ionization laser controls both switches through a delay controller. The delay controller itself may be connected to a fiber optic based trigger circuit. This circuit would use a fiber optic line coiled around the shock reflecting tube. The line would have a polarizing partial mirror on each end. A laser would shine a beam into one end. The polarized light from the first partial mirror follows the path of the coil to the second mirror which will transmit or reflect the beam based on its polarization. A photodetector will register the beam emanating from the second mirror and send a signal to the trigger that controls the delay controller. A pulse from the pre-ionization laser is split by partial mirror to the delay controller and to optical filters which directs the pulse into the shock reflecting chamber. The optical filter may include but are not limited to Axicon Lenses, Dual focus lenses, parabolic mirror lenses with a hole as in FIGS. 15A-E.

The pre-ionization laser pulse will begin to excite the gas. This could be registered by the fiber optic trigger circuit, which will send a signal to the delay circuit. The delay circuit will allow the nanosecond laser pulse to switch the first switch isolating the high voltage source. The ultrashort laser will then send a pulse to the shock reflecting tube ionizing the gas. The ultrashort laser may be controlled by a trigger circuit which senses the change in current from the high voltage source and subsequently initiates the ultrashort laser pulse, providing better timing of the laser pulses. Once plasma flow is initiated the photosensitive trigger will sense the flow and trigger the delay circuit to allow the nanosecond pulse to trigger the second switch closing the circuit between the capacitor and the load.

The pre-ionization laser may also be used with high voltage probes powered by an axillary high voltage source. In this case the photosensitive trigger will be connected to the auxiliary high voltage source.

Figures 16A, 16B:
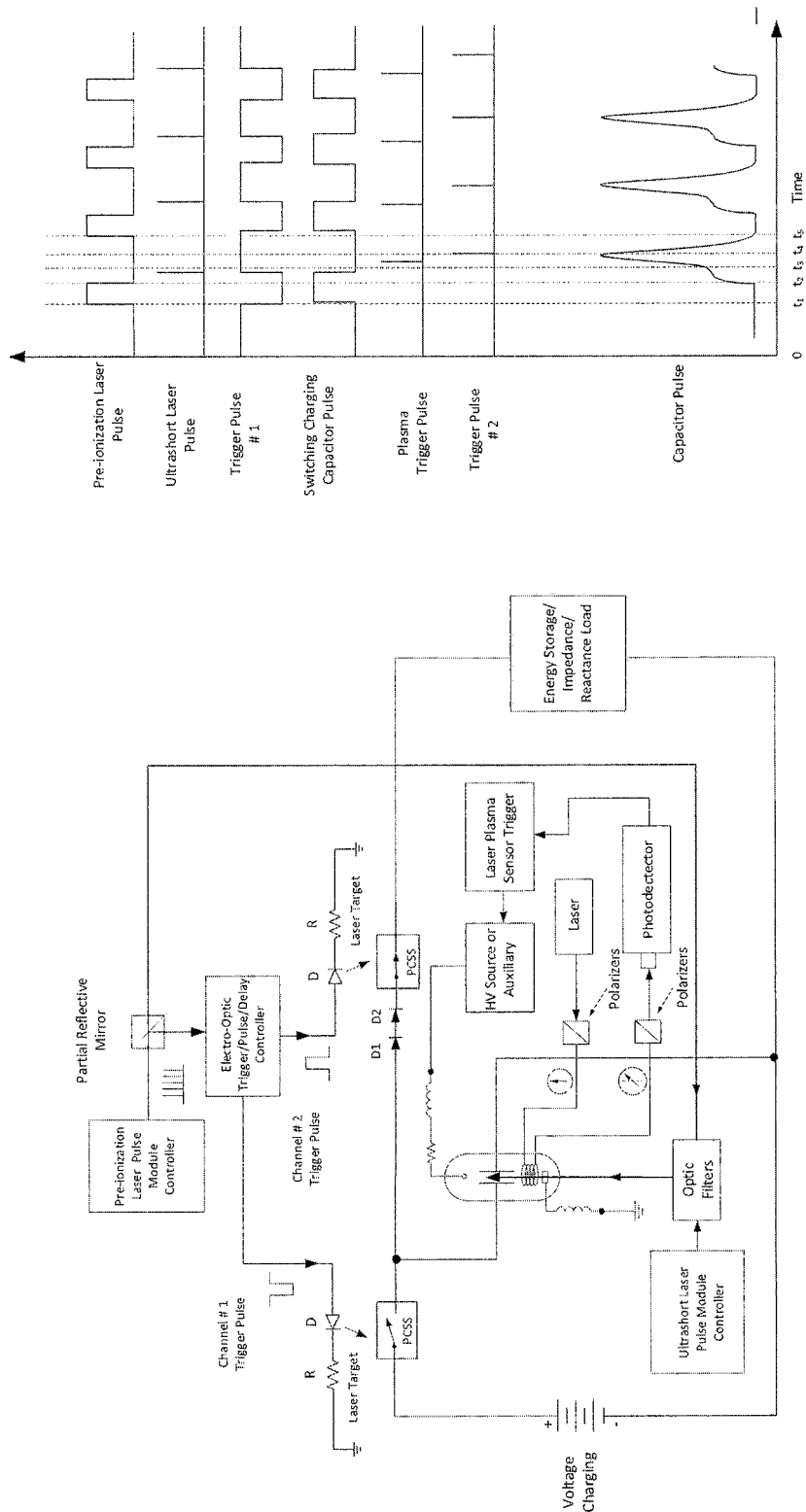
FIG. 16A. Depicts a circuit for the use of the plasma capacitor system involving dual lasers and an auxiliary high voltage power supply.
FIG. 16B. Depicts the switch timing for the plasma capacitor system involving dual lasers and an auxiliary high voltage power supply FIG. 17A. Depicts the functionality of a Dielectric Barrier Discharge Mirror FIG. 17B. Depicts the functionality of a Dielectric Barrier Discharge Mirror FIG. 17C. Depicts a DBDM adapted for use in the plasma capacitor system FIG. 18. Depicts a circuit for the use a DBDM within the plasma capacitor system.
Figure 22:
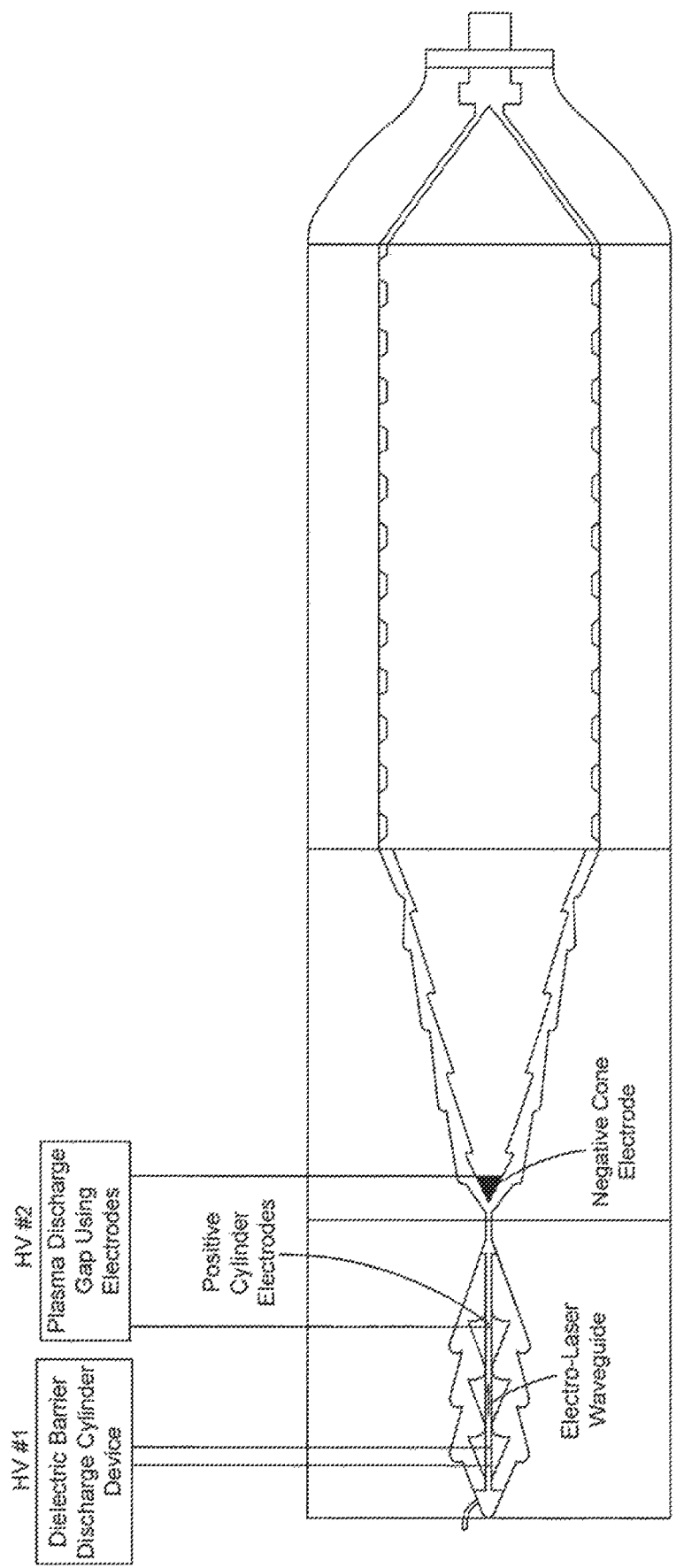
FIG. 22 Depicts use of a DBDC and discharge gap within a plasma compressor.

The discharge gap is made up of a pair of high voltage probes. As show in FIG. 16A probes are placed within the oscillating chamber with the positive probe downstream of the capacitor and the ground probe upstream of the capacitor. The ground probe is typically a disk of cylindrical, while the positive probe is typically spherical and placed at the center of the heat sink. The probes are used to produce a large electric potential across the gas which will enable larger amounts of plasma generation, producing a more powerful magnetic field and as a result a larger current from the capacitor to the load. The anode may be connected to an auxiliary high voltage source or even a lightning rod. The auxiliary high voltage source could be controlled by a photosensitive trigger circuit similar the one used with the delay controller in FIG. 14. When the ultrashort laser creates the plasma the flow creates a magnetic field which affects the polarity of the sensing laser, triggering the auxiliary high voltage source. Timing of the switches and output power are qualitatively shown in FIG. 16B. As shown in FIG. 22, the discharge gap is also effective in the plasma compressor, when one electrode is placed within laser bore tube (20) and the other caps the cone insert (25).

The Dielectric Barrier Discharge Mirror (DBDM) may be used in conjunction with the nanosecond and enables use of the capacitor without a femtosecond laser. As shown in FIGS. 17A-B, DBDM uses transparent material that produces a conductive plasma region on the top for its electrical conductivity, optical reflectivity and transparency. It has installed two coupled electrodes (either with semiconductor coating or metallic material). The two electrodes are connected a high voltage source. The dielectric phenomenon enables the mirror to increase the thickness and concentration of charge carriers floating on the top. This allows a laser beam to remove the concentration of charge carriers out of this special mirror where the dielectric material becomes conductive and decreases its transparency. The decrease of transparency during high voltage operation eliminates the need for a laser beam dump component. The Brewster angle for this mirror also enables the laser beam reflecting off to carry the concentration of charge carriers along its laser beam in a gaseous phase. This method allows and keeps the laser beam path at much lower energy and produces plasma discharge sufficiently and efficiently at much lower cost of operation. The mechanism may also be used to create an artificial path for guiding lightening to positions back to earth or common ground, in a process known as Stepped leader.

FIG. 17C shows a DBDM adapted for use within the plasma capacitor system within an oscillation tube. The DBDM (1701) is housed at one end of the puff plug (1705). The high voltage electrodes (1702) extend from one end of the DBDM. A wing bar (1703) connects a cathode ring electrode to ground. A laser beam input (1704) aligns nanosecond laser to the DBDM. Slot (1706) provides placement for a bar sensor.

Figure 18:
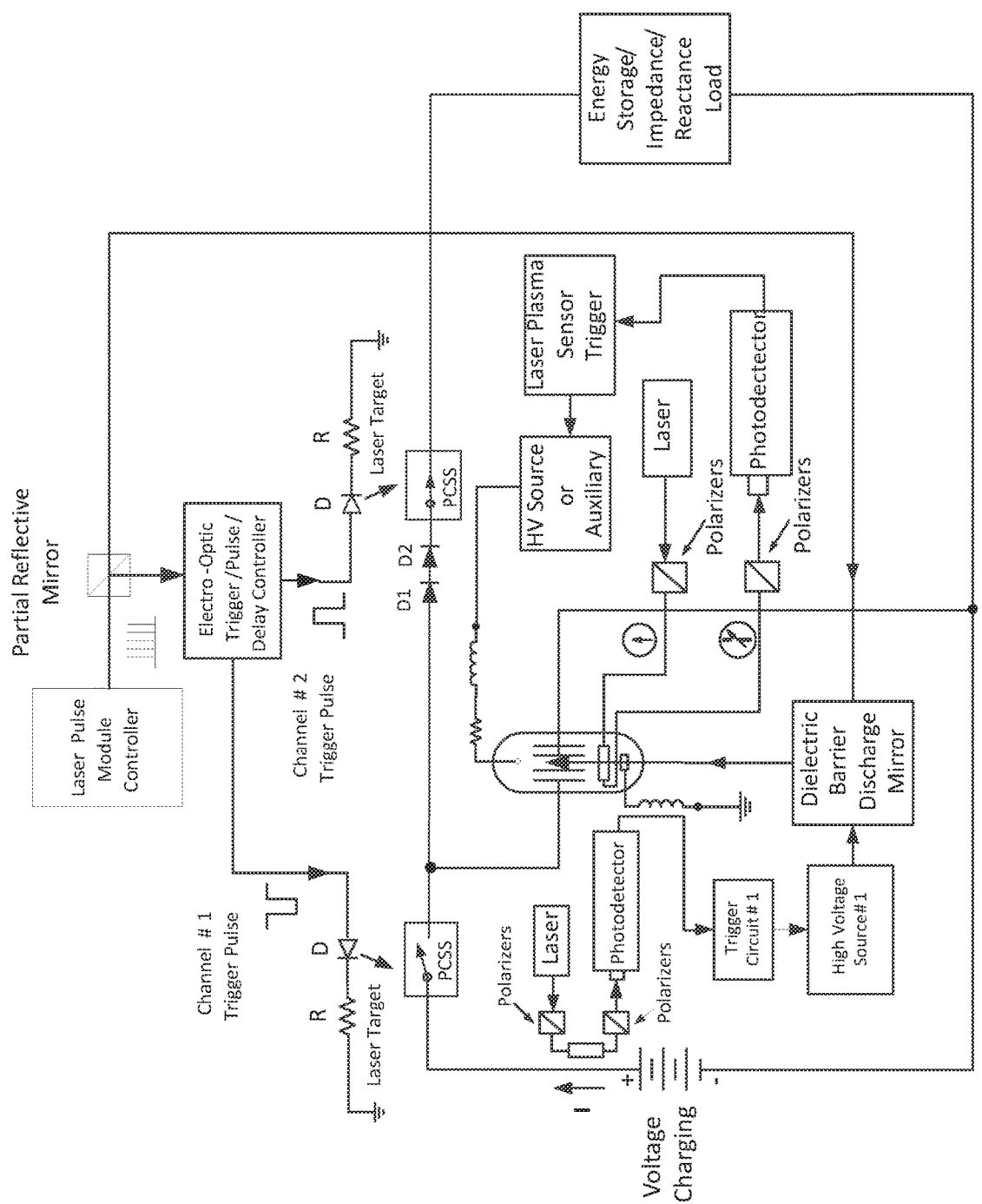

As shown in FIG. 18 The DBDM is primarily used in the capacitor circuit with the auxiliary high voltage probes. The femtosecond laser is replaced by a less expensive laser, and a third high voltage source is added connected to the DBDM. The third source may be programmed to be in sync with the nanosecond laser. The third high voltage source may also connect to a trigger circuit senses changes in the high voltage charging current.

Figure 19:
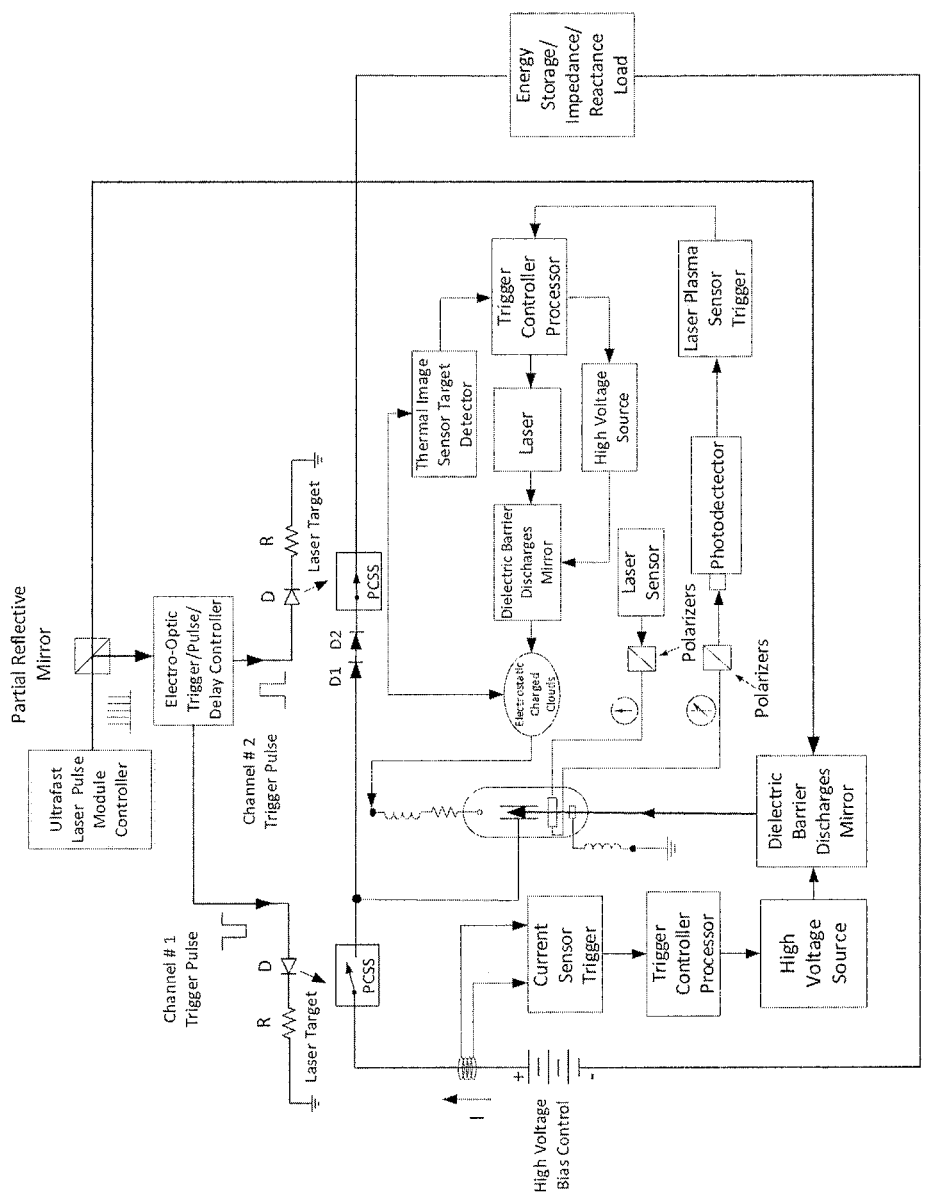
FIG. 19. Depicts a circuit for use of the plasma capacitor to harness lighting.

FIG. 19 shows the capacitor and oscillating chamber may be used to harness some of the power of lightning. In this case the auxiliary high voltage source is replaced by a laser and DBDM. When triggered by the photosensitive trigger, the laser will emit a beam, modified by the DBDM to carry a charge to an electrically charged cloud. This creates the artificial path for the lightning to follow back to the high voltage probe within the oscillating chamber.

Figure 20:
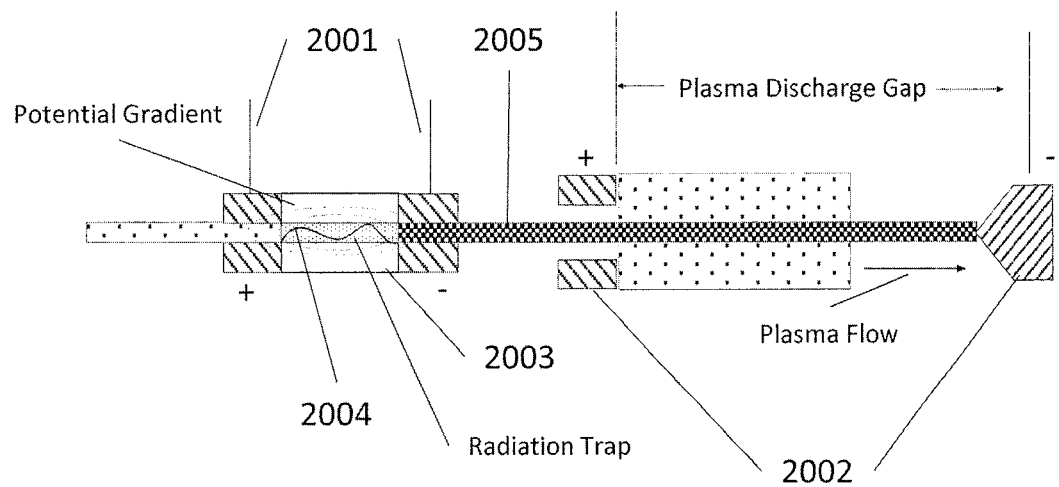
FIG. 20 Depicts formation of a Dielectric Barrier Discharge Cylinder (DBDC) to produce an electro-laser waveguide.

The Electro-laser waveguide may be produced by a cylinder device which may be used in place of the DBDM and enables use of both the capacitor and compressor systems without the need of a femtosecond laser. As shown in FIGS. 20 A and 20 B, the cylinder device (2000) is made up of two ring probes (2001) separated by a dielectric cylinder (2003). As voltage is applied to the ring probes (2001), a plasma arc (2005) will begin to form between the two electrodes. These dielectric barrier discharges produce some radiation emissions that produces a "plasma radiation trap" the enables enable the typical laser beam to trap electrons and carry with the electric field wavelength of laser beam. As a typical laser beam travels through the dielectric cylinder, Dopplertron effect and plasma radiation trap changes the typical beam into an ultra-intense conductive laser beam (electro-laser) (2005) cable of acting as a waveguide for plasma flow. FIG. 22 depicts the use of the electro-laser wave guide within the plasma compressor. The cylinder device (2000) is within the bore tube (20) near it entrance with a discharge gap downstream.

Figure 21:
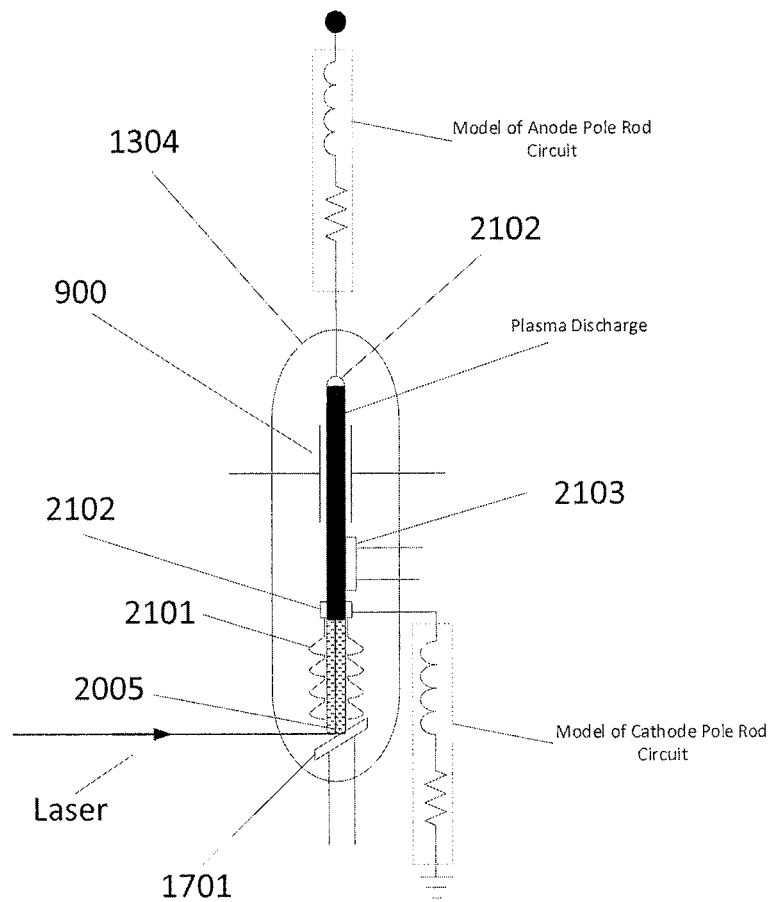
FIG. 21 Depicts use of a check valve within an oscillating chamber.

FIG. 21 depicts the use of a check valve within the oscillating chamber (1304). The electro-laser (2005) in this embodiment is formed by the DBDM. The electro-laser (2005) travels through a check valve (2101) to ensure a maximum amount of ions remain entrained within the laser. The fiber optic bar sensor (2103) will detect the electro-laser via the magnetic field caused by the entrained ions and trigger an aux high voltage source to energize the plasma discharge gap electrodes (2102) to aid in the plasma production.

FIG. 23 depicts the mechanism for harnessing lightning described above. A thermal imaging detector is used to identify electrically charged clouds. The detector sends a signal to a trigger controller, and a processor, which calculates cloud concentration and laser angle. The trigger controller will send a signal to both a high voltage source and a laser. The high voltage source will energize the leads in a DBDM such that when the laser reflects off the DBDM it will form a plasma waveguide directed to a Laser Guide Channeling Device Altitude Adjuster, which includes a mirror and electrodes. The Altitude Adjuster is electrically connected with multiple anode electrodes within a bank of oscillating chambers. The bank of oscillating chambers are electrically connected to energy storage banks that power loads through a power distribution network. The Altitude Adjuster will direct the plasm wave guide to the selected clouds forming the Stepped Leader. The cloud will discharge a lighting bolt along the path of the stepped leader to the electrode within the Altitude adjuster, powering the bank of oscillating chambers. A portion of the energy of the lightning bolt will be absorbed by the plasma capacitors within the oscillating chambers which may be either stored or used to power loads.

Figure 24B:
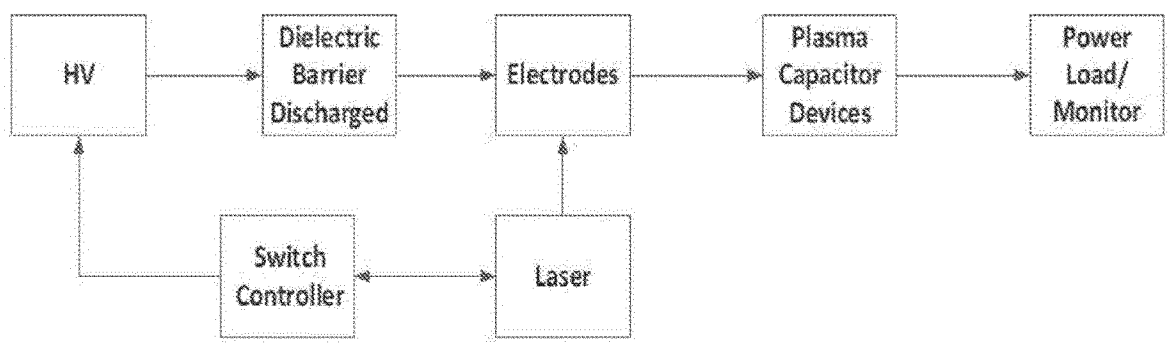

FIGS. 24*a* and 24*b* show a more compact embodiment of the gas-filled oscillating chamber and block diagram of its use. A switch controller is electrically connected to a laser and a high voltage source. The high voltage source is connected to an electrode with a hole 2409 drilled within it to create a path for the laser, which enables the electrode to act as a dielectric barrier device. The switch controller may energize the laser and the high voltage source. The laser may create a waveguide through a capacitor to an electrode connected to a ground. The laser may create a waveguide to a capacitor and an electrode connected to a ground. The high voltage source may energize to source electrode 2407 in turn creating a discharge barrier device. Electrons will arc from the source electrode to the grounded electrode producing a plasma flow through the capacitor. The capacitor 2400 may be made of an inner layer 2405 of an outer layer 2403 of conductive wire mesh. The layers of mesh may be separated by a dielectric or air. The capacitor will absorb a portion of the energy of the plasma flow and directs it to an electrical load. The outer structural support 2411 and the inner structural support 2413 hold the conductive layers in place.

The examples set forth above are provided to give those of ordinary skill in the art a complete disclosure and description of the optic lens system, electro-laser waveguide, dielectric barrier discharge device, and methods to control and/or redirect laser beams, shock waves or pulses in the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims. The foregoing Detailed Description of exemplary and preferred embodiments is presented for purposes of illustration and disclosure in accordance with the requirements of the law. It is not intended to be exhaustive nor to limit the disclosed subject matter to the precise form or forms described, but only to enable others skilled in the art to understand how the disclosed subject matter may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration of those advancements, namely in accordance with the then current state of the art. It is intended that the scope of the disclosed subject matter be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

I claim:

1. A plasma capacitor system comprising:
   a capacitor comprising one or more sets of layers comprising:
      at least one first component layer made of an insulator,
      at least one second layer made of a conductor;
   a structural support:
   the capacitor is disposed around a center axis;
   a first lead connected to the at least one second layer,
   a second lead in electrical communication with the one or more sets,
   the first lead in electrical communication with a terminal of a first high voltage power supply via a first photosensitive switch,
   the second lead in electrical communication with a ground;
   the first lead also in electrical communication with a load via a second photosensitive switch;
   the second lead also in electrical communication with the load; and,
   a first laser pulse controller optically communicating through optical fibers to a splitter, an electro optic trigger delay controller, the first photosensitive switch, the second photosensitive switch, and an optical filter aligned with the center axis.

2. The system of claim 1, wherein the insulator may be a dielectric, semi-conductor, or ambient gas and the conductor may be formed as a solid plate or a wire mesh.

3. The system of claim 2, wherein the first laser pulse controller is capable of emitting an ultrashort femtosecond laser pulse.

4. The system of claim 3, further comprising a shock reflecting tube aligned with the center axis, surrounded by and in physical contact with the capacitor.

5. The system of claim 4, wherein the shock reflecting tube comprises a glass or dielectric cylinder with an inner diameter axial bore extending a first end into the cylinder, an expansion to a larger inner diameter bore, the larger inner diameter bore extending to a second end of the tube, wherein a focal point of the focusing piece is downstream of the expansion.

6. The system of claim 2, wherein the first laser pulse controller is capable of emitting a nanosecond laser pulse.

7. The system of claim 6, wherein a second laser pulse controller optically communicating through optical fibers with the optical filter, wherein the second laser pulse controller is capable of emitting a femtosecond laser pulse.

8. The system of claim 7, wherein the second laser pulse controller may be triggered by a trigger circuit sensing current from the first high voltage source.

9. The system of claim 8, wherein the delay controller may be triggered by a trigger circuit sensing current along the center axis, caused by the nanosecond laser pulse.

10. The system of claim 2, further comprising a first probe downstream of the one or more sets of capacitor layers, electrically connected to a second high voltage source.

11. The system of claim 10, further comprising a second probe upstream of the one or more sets of capacitor layers, electrically connected to a common ground.

12. The system of claim 11, wherein the second high voltage source is in electrical communication with a trigger circuit which senses change of electrical current along the center axis.

13. The system of claim 12, wherein the first laser pulse controller emits a nanosecond laser pulse.

14. The system of claim 13, wherein the optical filter may be a discharge barrier device comprising a first electrode, a second electrode, and a dielectric separating the electrodes, wherein the first electrode and the second electrode are electrically coupled to a third high voltage source.

15. A method of powering a load via a plasma capacitor comprising:
   charging a plasma capacitor via a first high voltage power supply;
   emitting a laser pulse from a first laser pulse controller;
   splitting the laser pulse to a delay controller and an optical filter, said optical filter aligning the laser pulse to the plasma capacitor;
   increasing the charge of the plasma capacitor by producing an electromagnetic field and exposing the plasma capacitor to the electromagnetic field, wherein in the step of producing the electromagnetic field comprises creating a plasma flow within a laser driven plasma system using the laser pulse;

isolating the first high voltage source by emitting a first delayed laser pulse from the delay controller to a first photosensitive switch;

powering a load by closing a circuit between the capacitor and the load, wherein the step of closing the circuit comprises emitting a second delayed laser pulse from the delay controller to a second photosensitive switch discharging the capacitor to the load, and upon termination of the pulse resetting the first photosensitive switch and the second photosensitive switch, recharging the capacitor with the first high voltage power supply, and repeating until the load no longer requires power.

16. The method of claim 15 further comprising, wherein the step of emitting a laser pulse from a first laser pulse controller comprises emitting a nanosecond laser pulse.

17. The method of claim 16 further comprising, producing a preplasma state via the nanosecond laser pulse.

18. The method of claim 17 further comprising, sensing a first current flow in the preplasma via a first trigger circuit.

19. The method of claim 18 further comprising, receiving a signal from the first trigger circuit and energizing a high voltage probe from a second high voltage source.

20. The method of claim 18, wherein the step of emitting a first delayed laser pulse further comprises, further comprises receiving a signal from the first trigger circuit.

21. The method of claim 18 further comprising, sensing a drop in current of the first high voltage power supply via a second trigger circuit.

22. A method of powering a load via a plasma capacitor comprising:

emitting a laser pulse from a first laser pulse controller to an optical filter;

aligning the laser pulse to the plasma capacitor via the optical filter, increasing the charge of the plasma capacitor by producing an electromagnetic field and exposing the plasma capacitor to the electromagnetic field, wherein in the step of producing the electromagnetic field comprises creating a plasma flow within a laser driven plasma system using the laser pulse;

powering a load by discharging the capacitor to the load, and repeating until load no longer requires power.

23. The method of claim 22, further comprising:

charging a plasma capacitor via a first high voltage power supply;

splitting the laser pulse to a delay controller and the optical filter;

isolating the first high voltage source by emitting a first delayed laser pulse from the delay controller to a first photosensitive switch;

emitting a second delayed laser pulse from the delay controller to a second photosensitive switch, wherein powering the load comprises closing a circuit between the capacitor and the load; and upon termination of the pulse resetting the first photosensitive switch and the second photosensitive switch, recharging the capacitor with the first high voltage power supply.

* * * * *

UNITED STATES PATENT AND TRADEMARK OFFICE
CERTIFICATE OF CORRECTION

| | |
|---|---|
| PATENT NO. | : 11,310,900 B2 |
| APPLICATION NO. | : 16/132084 |
| DATED | : April 19, 2022 |
| INVENTOR(S) | : Anthony Calomeris |

Page 1 of 5

It is certified that error appears in the above-identified patent and that said Letters Patent is hereby corrected as shown below:

On the Title Page

Please replace the Title Page with the attached Title Page showing the corrected number of drawing sheets.

In the Drawings

Figure 23B:
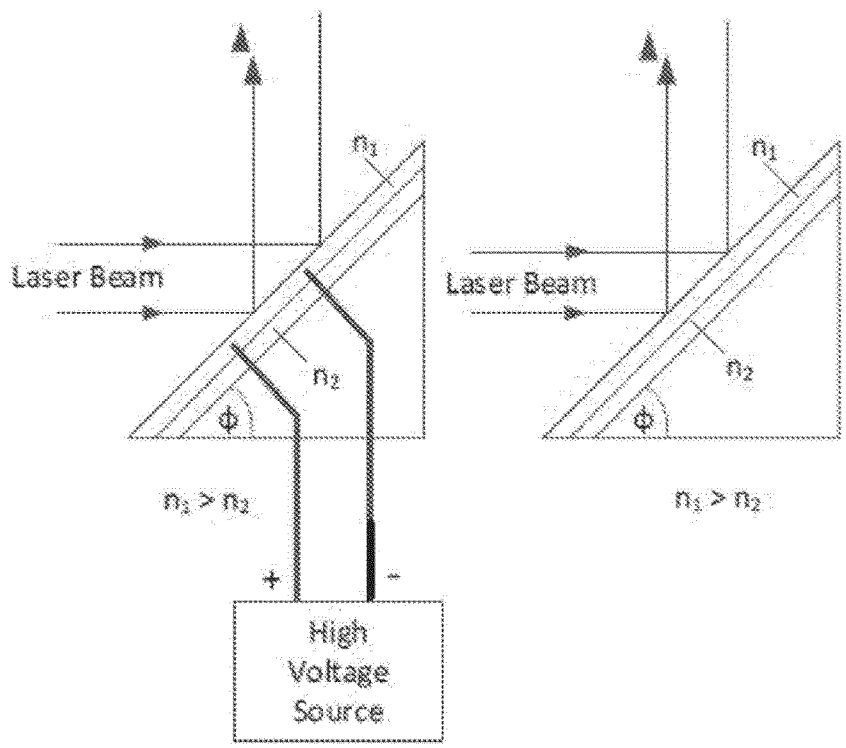

Please add Figures 23B, 24a and 24b as shown on the attached drawing sheets.

In the Specification

In Column 5, at Line 27: insert --"FIG. 23A depicts the mechanism for harnessing lightning"--.

In Column 5, at Line 28: insert --"FIG. 23B depicts the mechanism for harnessing lightning"--.

In Column 5, at Line 29: insert --"FIG. 24a shows a more compact embodiment of the gas-filled oscillating chamber and block diagram of its use"--.

In Column 5, at Line 31: insert --"FIG. 24b shows a more compact embodiment of the gas-filled oscillating chamber and block diagram of its use"--.

Signed and Sealed this
Eleventh Day of March, 2025

Coke Morgan Stewart
*Acting Director of the United States Patent and Trademark Office*

(12) United States Patent
Calomeris

(10) Patent No.: US 11,310,900 B2
(45) Date of Patent: Apr. 19, 2022

(54) PULSE LASER-DRIVEN PLASMA CAPACITOR

(71) Applicant: Anthony Calomeris, Silver Spring, MD (US)

(72) Inventor: Anthony Calomeris, Silver Spring, MD (US)

(*) Notice: Subject to any disclaimer, the term of this patent is extended or adjusted under 35 U.S.C. 154(b) by 888 days.

(21) Appl. No.: 16/132,084

(22) Filed: Sep. 14, 2018

(65) Prior Publication Data
US 2019/0120219 A1   Apr. 25, 2019
US 2020/0217310 A9   Jul. 9, 2020

Related U.S. Application Data

(63) Continuation-in-part of application No. 15/499,837, filed on Apr. 27, 2017, now Pat. No. 10,704,540.

(60) Provisional application No. 62/657,251, filed on Apr. 13, 2018, provisional application No. 62/657,217, filed on Apr. 13, 2018, provisional application No. 62/558,516, filed on Sep. 14, 2017, provisional application No. 62/491,104, filed on Apr. 27, 2017, (Continued)

(51) Int. Cl.
*H05H 1/24* (2006.01)
*H01G 4/018* (2006.01)
*H01B 3/00* (2006.01)
*H02J 7/34* (2006.01)

(52) U.S. Cl.
CPC .......... *H05H 1/2406* (2013.01); *H01B 3/00* (2013.01); *H01G 4/018* (2013.01); *H02J 7/345* (2013.01); *H02J 2207/40* (2020.01); *H02J 2207/50* (2020.01)

(58) Field of Classification Search
CPC ........ H05H 1/2406; H01B 3/00; H01G 4/018; H02J 7/345; H02J 2207/40; H02J 2207/50; F04B 19/24; F04B 53/10; F04F 7/00
USPC .......................................................... 320/166
See application file for complete search history.

(56) References Cited

U.S. PATENT DOCUMENTS

| | | | |
|---|---|---|---|
| 6,586,757 B2* | 7/2003 | Melnychuk | B82Y 10/00 250/493.1 |
| 10,279,531 B2* | 5/2019 | Pagliarini | B29C 49/46 |
| 10,704,540 B2* | 7/2020 | Calomeris | F04B 53/10 |

OTHER PUBLICATIONS

Hidenori et al., Industrial Applications of Pulsed Power Technology, Jul. 19, 2007, IEEE Transactions on Dielectrics and Electrical Insulation vol. 14, No. 5; Oct. 2007, pp. 1051-1061 (Year: 2007).*
(Continued)

*Primary Examiner* — M Baye Diao
(74) *Attorney, Agent, or Firm* — Duane Morris LLP; Patrick Craig Muldoon

(57) ABSTRACT

Systems and method of electrical power generation. The system and method controls the timescale of electron dynamics and makes use of avalanche ionization, electro-dynamic flows, magnetic fields, polarization, radiation emissions, shock wave front, impulse pressure, and heat transfer, created by plasma generated by exposing a fluid to an ultrashort wavelength laser pulse from a femtosecond laser, a nanosecond laser combined with a femtosecond laser, or a typical laser enhanced by a discharge barrier, and the fluid guided by a shock reflecting tube, electro-laser wave guide, plasma discharge gap or check valves that create vortexes to resist backflow, through a capacitor. The fluid and plasma being accumulated and recombined in a storage chamber in a compressed state, or recycled for cyclical power generation.

23 Claims, 24 Drawing Sheets

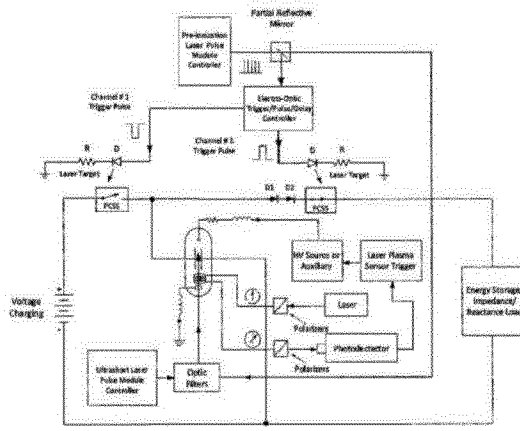

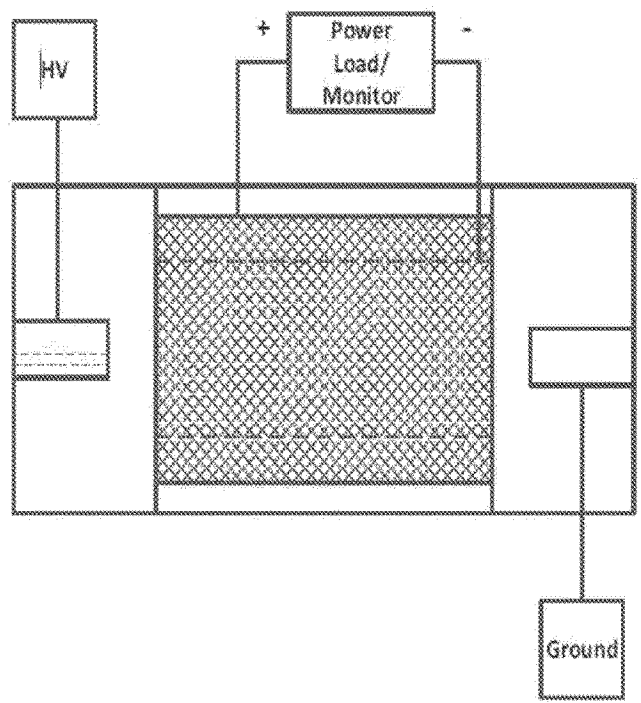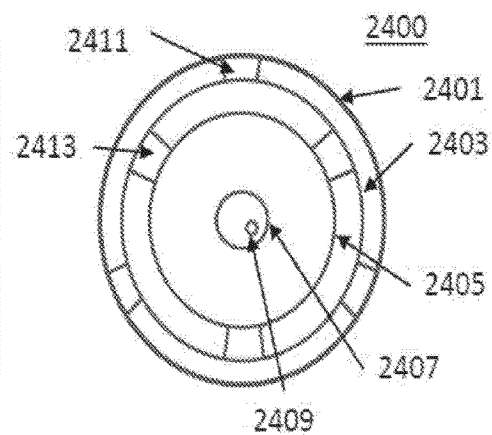
Fig. 24a